US012623929B2

(12) United States Patent
Bakow et al.

(10) Patent No.: US 12,623,929 B2
(45) Date of Patent: May 12, 2026

(54) INTERNET-OF-THINGS ENABLED DEIONIZATION TANK CONFIGURATION ARTIFICIAL INTELLIGENCE ALGORITHM

(71) Applicant: Evoqua Water Technologies LLC, Pittsburgh, PA (US)

(72) Inventors: Justin Bakow, Sewickley, PA (US); Ronald Parks, Coraopolis, PA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 349 days.

(21) Appl. No.: 18/271,061

(22) PCT Filed: Jan. 11, 2022

(86) PCT No.: PCT/US2022/011933
§ 371 (c)(1),
(2) Date: Jul. 6, 2023

(87) PCT Pub. No.: WO2022/150749
PCT Pub. Date: Jul. 14, 2022

(65) Prior Publication Data
US 2024/0109795 A1 Apr. 4, 2024

Related U.S. Application Data

(60) Provisional application No. 63/135,778, filed on Jan. 11, 2021.

(51) Int. Cl.
*C02F 1/42* (2023.01)

(52) U.S. Cl.
CPC .......... *C02F 1/42* (2013.01); *C02F 2001/427* (2013.01); *C02F 2209/006* (2013.01); *C02F 2209/05* (2013.01); *C02F 2209/40* (2013.01)

(58) Field of Classification Search
CPC .... C02F 1/42; C02F 1/008; C02F 1/00; C02F 1/4674; C02F 2001/427; C02F 2209/006;
(Continued)

(56) References Cited

U.S. PATENT DOCUMENTS

| | | | |
|---|---|---|---|
| 10,662,085 B2 | 5/2020 | Ganzi et al. | |
| 2013/0006023 A9* | 1/2013 | Bachman | C02F 1/42 |
| | | | 570/177 |

(Continued)

FOREIGN PATENT DOCUMENTS

| | | |
|---|---|---|
| CH | 709327 A2 | 9/2015 |
| CN | 1284048 A | 2/2001 |

OTHER PUBLICATIONS

International Search Report, in corresponding PCT/US2022/011933, Dated Mar. 28, 2022.
(Continued)

*Primary Examiner* — Akash K Varma

(57) ABSTRACT

A method of treating water in a water treatment system comprises introducing water to be treated into an ion exchange bed of the water treatment system to produce treated water, receiving an output water quality indication from a controller associated with the ion exchange bed, determining, by an algorithm, responsive to the output water quality indication, whether to replace the ion exchange bed based on a remaining capacity of the ion exchange bed, current operational parameters of the water treatment system, and historical data regarding operation of the water treatment system, and responsive to the water quality indication, providing, by the algorithm, a recommendation to a service provider of the water treatment system that there is one of no action required, that the ion exchange bed should be monitored, or that a service order for replacement of the ion exchange bed should be generated.

11 Claims, 11 Drawing Sheets

(58) Field of Classification Search
CPC .............. C02F 2209/05; C02F 2209/40; C02F
2209/001; C02F 2209/003; C02F
2209/008; C02F 2209/005; C02F
2303/16; G01N 33/18; G01F 23/804
USPC ........................................................ 210/660
See application file for complete search history.

(56)                    References Cited

U.S. PATENT DOCUMENTS

| | | | |
|---|---|---|---|
| 2017/0050866 A1* | 2/2017 | Ganzi | C02F 1/4674 |
| 2018/0075399 A1* | 3/2018 | Agarwal | G01F 23/804 |
| 2019/0112201 A1* | 4/2019 | Branum | G01N 33/18 |
| 2020/0216333 A1* | 7/2020 | Hoefferle | C02F 1/42 |

OTHER PUBLICATIONS

Wolf, Gundula, "Extended European Search Report", European Patent Application No. 22737283.6, mailed Oct. 14, 2024.
Unknown, "First Office Action", Chinese Patent Application No. 202280009565.9, mailed Jul. 22, 2025, 29 pages.
Jing, Lin, "Second Office Action", Chinese Patent Application No. 202280009565.9, mailed Dec. 12, 2025, 34 pages.

* cited by examiner

| Fiscal Year | Active Device Count | Yearly Increase | Quality Alarm SVO Count | Yearly Increase | SVO Count / Site | Yearly Increase | Linear Ratio | Linear Ratio SVO Count/site Increase | Yearly Increase (Decrease) |
|---|---|---|---|---|---|---|---|---|---|
| 1 | 1,270 | | 2,852 | | 2.3 | | | | |
| 2 | 1,544 | 21.6% | 4,935 | 73.0% | 3.2 | 42.3% | 1,270x = (2.3 x 1544) | 2.7 | 14.6% |
| 3 | 1,842 | 19.3% | 6,349 | 28.7% | 3.5 | 7.8% | 1,544x = (3.2 x 1842) | 3.8 | (10.6%) |

FIG. 7

| Fiscal Year | Labor Cost | Total Labor/Site | Linear Labor/Site | Excess Costs or (Savings) per Site | Total Costs or (Savings) |
|---|---|---|---|---|---|
| 1 | | | | | |
| 2 | $ 340 | $1,087 | $ 928.26 | $ 158.47 | $ 244,671.00 |
| 3 | $ 360 | $1,241 | $ 1,372.73 | ($ 131.88) | ($242,926.14) |

FIG. 8

| Exchange Date | Flow Days Since Prior Exchange | Resin Consumed | Gallons Consumed | Worker Alarm Active | Polisher Alarm Active |
|---|---|---|---|---|---|
| 9/27/21 | 20 | 86% | 12,075 | Yes | No |
| 10/21/21 | 23 | 109% | 14,593 | Yes | No |
| 11/18/21 | 27 | 96% | 13,827 | Yes | No |
| 12/15/21 | 26 | 78% | 11,149 | Yes | No |

INTERNET-OF-THINGS ENABLED DEIONIZATION TANK CONFIGURATION ARTIFICIAL INTELLIGENCE ALGORITHM

CROSS-REFERENCE TO RELATED APPLICATIONS

This application claims priority under 35 U.S.C. § 119(e) to U.S. Patent Application Ser. No. 63/135,778, titled "IoT Enabled Deionization Tank Configuration AI Algorithm," filed on Jan. 11, 2021, which is herein incorporated by reference in its entirety for all purposes.

BACKGROUND

Field of Disclosure

Aspects and embodiments disclosed herein are directed generally to methods and apparatus for monitoring, controlling, and maintaining water treatment systems, and in particular to systems and methods of monitoring the condition of ion exchange-based water treatment systems.

Discussion of Related Art

Deionized (DI) water is an ingredient in hundreds of applications, including medical, laboratory processes, pharmaceuticals, cosmetics, electronics manufacturing, food processing, plating, countless industrial processes, and even the spot-free rinse water at the local car wash. Typically, it serves as an ultra-pure ingredient, a cleaning solvent, or as the foundation of a process water recovery/reuse strategy. Deionized water meeting Water-For-Injection (WFI) standards of purity is used as the basis for saline and other solutions to be injected into the body during medical procedures. Its bacteria-free and mineral-free purity helps assure the quality and stability of the solution as other ingredients are added to it. DI laboratory water is typically used to clean instruments and lab equipment and to perform tissue cell culture, blood fractionation, and other lab procedures. Deionized water in the pharmaceutical industry is used for preparing culture media, for making up aqueous solutions, and for washing containers and apparatus. It is also used as a raw material, ingredient, and solvent in the processing, formulation, and manufacture of pharmaceutical and neutraceutical products, active pharmaceutical ingredients (APIs) and intermediates, compendial articles, and analytical reagents. In semiconductor manufacturing, deionized water's properties for absorbing minerals, enhancing detergents and residue-free drying make it useful for rinsing and cleaning semiconductor wafers. It is also used in wet etching, bacterial testing and many other processes throughout the fabrication facility. Deionized water is commonly used to top up lead-acid batteries, cooling systems and for other applications. Deionized water is often used as an ingredient to add purity, stability and performance in many hair care, skin care, body care, baby care, sun care and makeup products, where it is sometimes referred to as "aqua" on product ingredient labels. Because of its high relative dielectric constant, deionized water is used as a high voltage dielectric in many pulsed power applications for energy research. Deionized water is used as both an ingredient and a process element in food and beverage processing. As an ingredient, it offers stability, purity and sanitation. As a process element, it is used for effective sanitation. In industrial plants, DI water facilitates water and wastewater recycling; adds efficiency and life extension to boiler and steam processes. Deionized water is used to pretreat boiler feed water to reduce scaling and energy use and to control deposition, carryover and corrosion in the boiler system. As such, DI water is an essential element in boiler water recycling. Deionized water can pretreat cooling tower make-up water to help reduce scaling and reduce energy use in power plants, petroleum refineries, petrochemical plants, natural gas processing plants, food processing plants, semi-conductor plants, and other industrial facilities. When used as a rinse after washing cars, windows, and similar applications, deionized spot-free rinse water dries without leaving spots caused by dissolved solutes, eliminating post-wash wipedowns.

Flow meters, conductivity and resistivity meters, temperature sensors, pH sensors and hydrogen sulfide sensors, for example, along with other scientific instruments are widely used in many remote locations for a variety of purposes including monitoring the condition of a water purification system. It is often necessary for workmen to physically visit the remote sites to monitor the flow meters or other instruments (e.g., samplers) to gather data. Multiple site visits in numerous locations is a challenging, labor intensive, and expensive task. Ensuring that each site is operational, and that maintenance or service is regularly scheduled provides for obtaining accurate and reliable data.

SUMMARY

In accordance with one aspect, there is provided a method of treating water in a water treatment system. The method comprises introducing water to be treated into an ion exchange bed of the water treatment system to produce treated water, receiving an output water quality indication from a controller associated with the ion exchange bed, determining, by an algorithm, responsive to the output water quality indication, whether to replace the ion exchange bed based on a remaining capacity of the ion exchange bed, current operational parameters of the water treatment system, and historical data regarding operation of the water treatment system, and responsive to the water quality indication, providing, by the algorithm, a recommendation to a service provider of the water treatment system that there is one of no action required, that the ion exchange bed should be monitored, or that a service order for replacement of the ion exchange bed should be generated.

In some embodiments, the algorithm further provides an indication of a confidence level of the provided recommendation.

In some embodiments, the method further comprises replacing the ion exchange bed responsive to the algorithm indicating that replacement of the ion exchange bed is warranted.

In some embodiments, the algorithm determines the confidence level based on historical data regarding one of instances of replacement of the ion exchange bed or instances of replacement of an ion exchange bed of another water treatment system, ion exchange bed alarm status, and remaining capacity of the ion exchange bed.

In some embodiments, responsive to providing a recommendation that the ion exchange bed should be monitored the algorithm performs additional monitoring of one or more of a status of the output water quality indication, a flow rate of water through the ion exchange bed, a quality measure of the water, and the remaining capacity of the ion exchange bed.

In some embodiments, the algorithm modifies the recommendation that the ion exchange bed should be monitored to one of a recommendation that the ion exchange bed should be replaced or a recommendation that no action is required.

In some embodiments, the additional monitoring includes receiving data regarding the one or more of the status of the output water quality indication, the flow rate of water through the ion exchange bed, or the quality measure of the water multiple times per day.

In some embodiments, the current operational parameters of the water treatment system include flow rate and conductivity of the treated water.

In some embodiments, the current operational parameters of the water treatment system further include environmental conditions at the water treatment system.

In some embodiments, the current operational parameters of the water treatment system further include time of year.

In some embodiments, the historical data regarding operation of the water treatment system includes environmental conditions at the water treatment system between previous occurrences of replacement of the ion exchange bed.

In some embodiments, the historical data regarding operation of the water treatment system includes times of year of previous occurrences of replacement of the ion exchange bed.

In accordance with another aspect, there is provided a method of treating water in a water treatment system. The method comprises introducing water to be treated into an ion exchange bed of the water treatment system to produce treated water, receiving an output water quality indication from a controller associated with the ion exchange bed, determining, by an algorithm, responsive to the output water quality indication, whether to replace the ion exchange bed based on a remaining capacity of the ion exchange bed, current operational parameters of the water treatment system, and historical data regarding operation of the water treatment system, responsive to the water quality indication, providing, by the algorithm, a recommendation to a service provider of the water treatment system that there is one of no action required, that the ion exchange bed should be monitored, or that a service order for replacement of the ion exchange bed should be generated, and determining and providing, by the algorithm, a recommended ideal ion exchange capacity recommendation for the water treatment system based on a current configuration of the water treatment system, average volume of water treated per time period, and prior ion exchange bed service history for one of the water treatment system or another water treatment system.

In some embodiments, providing the recommended ideal ion exchange capacity includes providing a recommended quantity and size of ion exchange beds for the water treatment system that would result in service to replace an ion exchange bed of the water treatment system after more than a predetermined amount of time.

In some embodiments, the algorithm further determines and provides an estimate of cost savings resulting from implantation of the ideal ion exchange capacity recommendation.

In some embodiments, the algorithm further determines and provides a recommended current ion exchange capacity recommendation for the water treatment system based on data regarding historical ion exchange bed exchanges, historical conductivity readings of water introduced into the water treatment system, and a historical average of a quantity of water treated during an exchange cycle before occurrence of a water quality alarm in one of the water treatment system or another water treatment system.

In accordance with another aspect, there is provided a non-transitory computer-readable medium comprising code executable on a computer to implement a method of monitoring water treatment on a water treatment system having an ion exchange bed. The method comprises responsive to an output water quality indication from the water treatment system, determining whether to replace the ion exchange bed based on a remaining capacity of the ion exchange bed, current operational parameters of the water treatment system, and historical data regarding operation of the water treatment system, responsive to the water quality indication, providing a recommendation to a service provider of the water treatment system that there is one of no action required, that the ion exchange bed should be monitored, or that a service order for replacement of the ion exchange bed should be generated, and determining and providing a recommended ideal ion exchange capacity recommendation for the water treatment system based on a current configuration of the water treatment system, average volume of water treated per time period, and prior ion exchange bed service history for one of the water treatment system or another water treatment system.

In some embodiments, the code further causes the computer to determine and provides a recommended current ion exchange capacity recommendation for the water treatment system based on data regarding historical ion exchange bed exchanges, historical conductivity readings of water introduced into the water treatment system, and a historical average of a quantity of water treated during an exchange cycle before occurrence of a water quality alarm in one of the water treatment system or another water treatment system.

In accordance with another aspect, there is provided a non-transitory computer-readable medium comprising code executable on a computer to implement a method of monitoring water treatment on a water treatment system having an ion exchange bed and a controller. The method comprises receiving an output water quality indication from the controller associated with the ion exchange bed, responsive to the output water quality indication, determining whether to replace the ion exchange bed based on a remaining capacity of the ion exchange bed, current operational parameters of the water treatment system, and historical data regarding operation of the water treatment system, and responsive to the water quality indication, providing, by the algorithm, a recommendation to a service provider of the water treatment system that there is one of no action required, that the ion exchange bed should be monitored, or that a service order for replacement of the ion exchange bed should be generated.

In some embodiments, the code further causes the computer to provide an indication of a confidence level of the provided recommendation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 is a table illustrating a reduction in service orders achieved by implementation of an artificial intelligence algorithm as disclosed herein;

FIG. 8 is a table illustrating a reduction in labor costs achieved by implementation of an artificial intelligence algorithm as disclosed herein;

DETAILED DESCRIPTION

Figure 1:
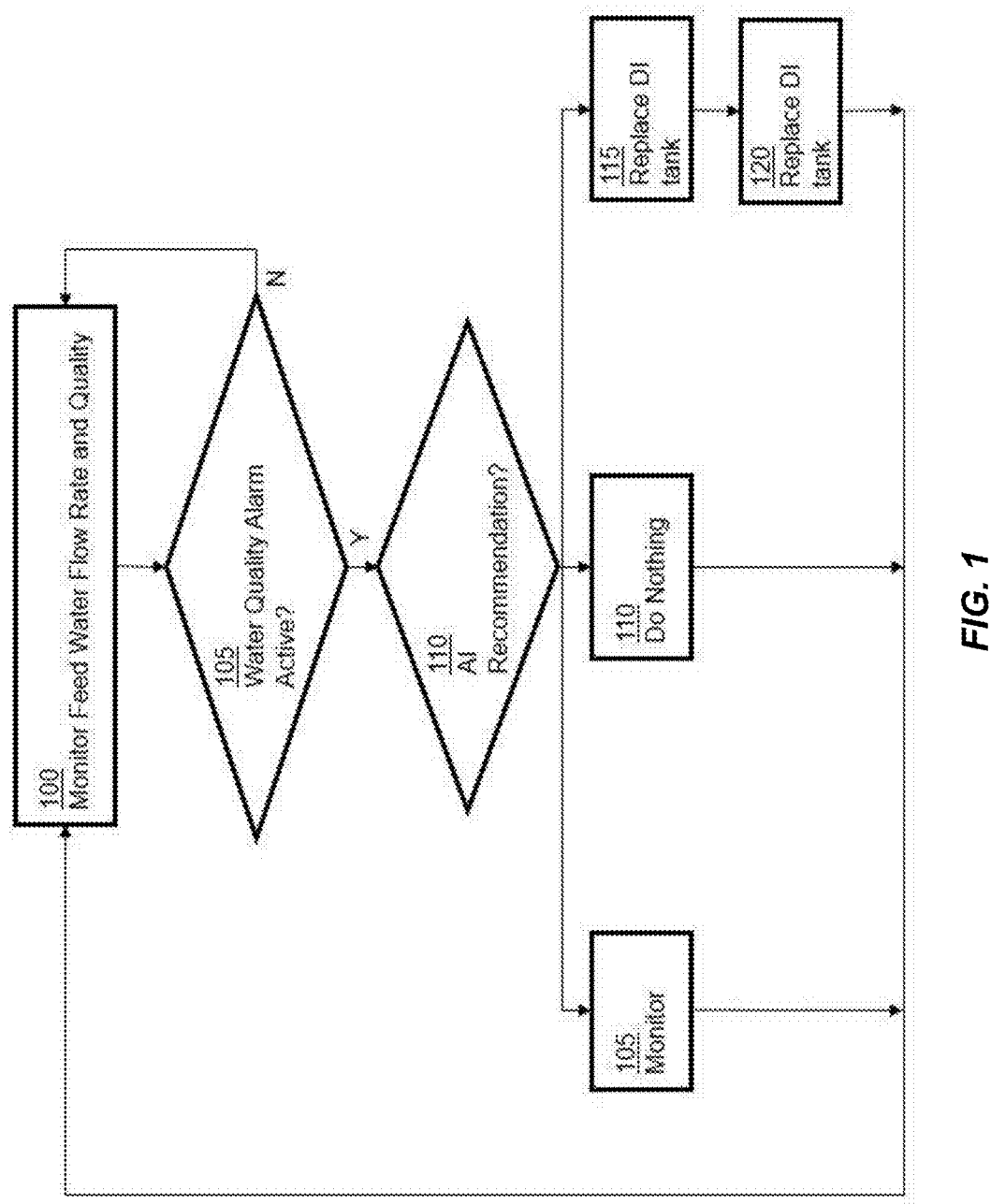
FIG. 1 is a flowchart of a method disclosed herein.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Aspects and embodiments disclosed herein include a wireless monitoring system which enables data collection from and monitoring of the status of various meters, sensors, and scientific instruments at one or more locations. The data may be gathered wirelessly, for example, by means of the GSM cellular telephone network using a modem connected to a computer or a hand-held device, by Wi-Fi, or other wireless data collection methods known in the art, e.g., based on the LTE Cat 1, LTE Cat M1, or Cat NB1 standard. In other embodiments, data may be gathered from the monitoring system via a wired connection to a centralized monitoring system.

Aspects and embodiments of the wireless monitoring system may be utilized in the environment of a water treatment system. The water treatment system may include one or more unit operations. The one or more unit operations may include one or more pressure-driven water treatment devices, for example, membrane filtration devices such as nanofiltration (NF) devices, reverse osmosis (RO) devices, hollow fiber membrane filtration devices, etc., one or more ion-exchange water treatment devices, one or more electrically-driven water treatment devices, for example, electrodialysis (ED) or electrodeionization (EDI) devices, one or more chemical-based water treatment devices, for example, chlorination or other chemical dosing devices, one or more carbon filters, one or more biologically-based treatment devices, for example, aerobic biological treatment vessels, anaerobic digesters, or biofilters, one or more radiation-based water treatment devices, for example, ultraviolet light irradiation systems.

The wireless monitoring system implements an artificial intelligence algorithm that determines when to schedule service for ion exchange beds of the water treatment system and that provides recommendations regarding capacity of the ion exchange beds.

The water treatment system may be utilized to treat water for industrial uses, for example, for use in semiconductor processing plants, food processing or preparation sites, for use in chemical processing plants, to produce purified water for use as laboratory water, for medical device manufacturing, or pharmaceutical production, or may be utilized to provide a site with water suitable for irrigation or drinking water purposes. In other embodiments, the water treatment system may be utilized to treat wastewater from industrial or municipal sources.

The water treatment system may include one or more sensors, probes, or instruments for monitoring one or more parameters of water entering or exiting any one or more of the one or more unit operations. The one or more sensors, probes, or instruments may include, for example, flow meters, water level sensors, conductivity meters, resistivity meters, chemical concentration meters, turbidity monitors, chemical species specific concentration sensors, temperature sensors, pH sensors, oxidation-reduction potential (ORP) sensors, pressure sensors, or any other sensor, probe, or scientific instrument useful for providing an indication of a desired characteristic or parameter of water entering or exiting any one or more of the one or more unit operations.

The monitoring system may be utilized to gather data from sensors, probes, or scientific instruments included in the water treatment system and may provide the gathered data to operators local to the water treatment system or to persons, for example, a water treatment system service provider, remote from the water treatment and monitoring system.

The monitoring system may include a computer system upon which is run an Artificially Intelligent (AI) algorithm designed to provide an output in the form of an operational recommendation based on the AI's prediction regarding the likelihood that a resin-based deionization (DI) tank (the terms DI tank and ion exchange bed being used herein synonymously) exchange is warranted in a water treatment system at a customer site. A tank exchange is generally recommended once quality sensors indicate an alarm condition, for example, insufficient water quality, often determined from the conductivity of water after treatment in a DI bed or tank during customer use. In some instances, water quality sensors in a water treatment system may issue a false positive water quality alarm due to, for example, excessive water flow or low water flow conditions or due to temporary spikes in incoming water contamination or due to a faulty sensor. Aspects and embodiments of the AI algorithm may determine whether a water quality alarm is "True" and not a false positive.

The algorithm provides a recommendation for a customer site's ideal DI capacity for exceptionally optimal service (exceptionally optimal service is defined as 1 tank exchange per year). DI capacity is defined as the quantity (in gallons) of water which the DI system is capable of processing prior to failing quality specifications. To a first order the DI capacity recommendation may be based on calculations involving the quantity, size of tanks, and feed water quality. The AI algorithm utilizes a blend of calculations which considers the previously mentioned DI calculations as well as analog data pertaining to site conditions, for example, environmental conditions (for example, dry, wet, hot, or cold weather), time of year, geographical location, etc., at the time of all prior exchanges and customer use. The algorithm may modify the first order DI capacity recommendation based on historical data, for example, DI capacity at a site for a predetermined previous time period, for example, over the course of the last two years, combined with current state updates regarding feed water flow rate and conductivity and remaining DI tank capacity. The current state updates may be processed 12 times a day—every two hours. Historical DI capacity measurements from other sites may also be used to modify the first order DI capacity recommendation, which may be useful for newly commissioned sites with little or no historical data. By using this algorithm, the incidents of quality excursions are reduced and the cost of maintaining high quality DI production while minimizing unnecessary service may be reduced.

Responsive to receiving an indication of a water quality alarm at a DI tank at a service site, embodiments of the disclosed AI algorithm may provide the following recommended "actions" to operations personnel who are responsible for triaging alarms: "Create Service Order," "No Action Required," and "Monitor." These recommendations may be based on factors such as historical data regarding conditions at the site when previous DI tank replacements/exchanges took place (time of year, environmental conditions, cumulative flow of feed water through a DI tank at the time of replacement of the DI tank, etc.), current site water quality (e.g., conductivity) and flow rate conditions, and/or environmental conditions at the site, and/or time of year. Embodiments of the disclosed AI Algorithm may also output the "Prediction Accuracy %"—i.e., the level of confidence that the algorithm's prediction/recommendation is true. The algorithm makes this determination based on a combination of historical data such as that described above and data regarding the current state of system, including, for example, worker/polisher tank alarm status (active/restored) and drops in measured remaining capacity.

Embodiments of the disclosed AI algorithm may assess all sites which are actively in an alarm state multiple, for example, 12, times a day. The AI algorithm interprets each new batch of data gathered from each assessment during a day and determines if the overall recommended "action" should change or remain the same.

Based on analysis of the historical and current data from a site by embodiments of the AI algorithm, recommended actions of "No Action Required" or "Monitor" may either "Restore" (i.e., revert to normal state—"No Action Required") or transition to "Create service order (SVO)." A timeboxed trigger of a predetermined, but user-modifiable time, for example, four days ensures that alarms related to low or marginal flow conditions which are especially prevalent in cases of DI tank channeling are handled expeditiously. For example, four days would typically be enough time for a tank to "polish up" and produce quality water. However, if channeling has started, it is unlikely that the tank would recover to produce the quality water.

Embodiments of the disclosed AI Algorithm may provide customer site (i.e., functional location) specific recommended ideal DI capacity recommendations based on current configuration (i.e., size and quantity of DI tanks), customer water processing/usage, and prior exchange service history. Ideal DI capacity is defined as the configuration which permits "exceptionally optimal" service of one DI tank exchange service visit per year.

To accomplish this the algorithm makes use of the below data attributes:

Flow Totals—customer usage over last 12 months

DI Tank sizes—in terms of cubic feet of resin (for example, 1.2 ft$^3$-3.6 ft$^3$)

Average feedwater conductivity—in terms of micro-siemens ($\mu$S/cm$^2$) which is a unit used to measure electrical conductance which is used to infer total dissolved solids (TDS) concentration. This measure may be retrieved from field service visits and stored in a database accessible by the AI algorithm as a measuring point. Alternatively, feedwater conductivity may be continuously or periodically monitored automatically locally at a customer's site and periodically reported to a central monitoring station and stored in a database accessible by the AI algorithm using conductivity sensors and reporting instrumentation as described in further detail below.

Calculated capacity—based on a formulaic calculation of expected capacity based on DI tank size and feed water TDS level as determined from the average feedwater conductivity measure.

Based upon the above factors, the AI Algorithm recommends an ideal DI tank quantity and size, which may be bounded by a maximum configuration size of five DI tanks in series (four in the worker position and one in the polisher position) per DI tank train.

In some embodiments, service deionization sites and their efficiencies are monitored by Digital Command Center Operations Specialists through mostly manual means with assistance from data reporting tools. When quality events are triggered, 100% are reviewed and a decision is made by the DCC Specialist to either create an SVO for an exchange or monitor the system at which the alarm was triggered for a period. This process can take anywhere from a couple minutes to 10 minutes for the DCC Specialist to fully review and make the decision.

As the number of monitored sites continues to grow the number of full-time employees (FTEs) needed to review each site also increases. (FTE Assumption: 40 hrs a week*4 weeks=160 potential hours*0.7 (discount for 30% non-productivity time)=112 hrs of bandwidth for 1 FTE/1 Month)

Each decision to create an SVO or not has a mathematical calculation based on tank configuration but in producing the ultimate decision, shortcuts may be taken due to human nature. Human judgment, given similar facts in two different scenarios, may produce different decisions. This variability results in inconsistent site configurations, over analysing, inconsistent exchange results and ultimately less confidence in site configuration.

Developing a prediction model to move this decision-making process to a repeatable non-biased algorithm making consistent decisions continually learning from prior decisions (feedback) will ultimately produce more efficient sites. Tank exchanges will be performed with confidence at optimal times freeing the DCC Specialists to review predefined gray areas to better train the model further reducing anomalies. Being able to spend 10 minutes studying an anomaly is a better use of the Specialists' time that deciding how to react to every individual alarm condition.

A prediction/recommendation model generated by the disclosed AI algorithm may include both an exchange prediction/recommendation and an optimal site capacity prediction/recommendation.

Generation of the Exchange Prediction/Recommendation by the AI Algorithm may include development of a predication model to determine the probability that a tank exchange at a given site is warranted based on quality events (e.g., ion exchange bed water quality alarms), feed water flow and quality (e.g., conductivity), and remaining capacity. The exchange prediction/recommendation model will have three possible outcomes:

a. Create SVO—No site triage required. Conditions are such that the AI Algorithm has verified quality of water is degrading and a DI tank exchange is recommended.

b. Monitor Sites—Possible site triage required. Conditions are in an area where the AI Algorithm needs more data to predict whether an exchange is warranted or not.

c. No Action/Ignore—No site triage required. Conditions remaining favorable for a site to keep delivering quantity and quality of water for the customer.

A flowchart of operation of the AI algorithm is illustrated in FIG. 1. In act 100 the wastewater treatment system is operating normally and continuously or periodically monitoring the flow rate and quality, e.g., conductivity of feed water into the system or into a DI tank. The remaining capacity of the DI tank is calculated, at a local controller or at a remote server, based on an initial capacity, cumulative flow of water through the DI tank, and the quality of the water entering the DI tank. An act 105 a controller of the wastewater treatment system (local or remote) determines if the DI tank is in an alarm state due to poor quality (e.g., conductivity above a setpoint) water exiting the DI tank. If there is no water quality alarm, the method returns to monitoring the feed water flow rate and quality in act 100. If there is a water quality alarm, the AI algorithm determines how to respond (act 110). As discussed above, the AI algorithm may take into consideration historical data regarding previous DI tank exchanges, the estimated remaining capacity of the DI tank, and current conditions of feed water quality and flow rate into consideration to determine how to respond to the water quality alarm. If the AI algorithm determines that the alarm is a false alarm, it may provide a recommendation to do nothing (act 110) and, the method returns to monitoring the feed water flow rate and quality in act 100. If the AI algorithm determines that the alarm indicates a true DI tank capacity depletion condition (or condition of imminent capacity depletion) it may provide a recommendation to replace or exchange the DI tank (act 115) which service personnel should follow (act 120) before putting the wastewater treatment system back into service and returning to monitoring the feed water flow rate and quality in act 100. If the AI algorithm determines that the alarm condition may be a false alarm, for example, if the remaining capacity is calculated to be more than sufficient or if false alarms occurred previously under similar conditions the AI algorithm may recommend to enter a monitoring state (act 105) in which the feed water parameters and other operational parameters of the wastewater system are monitored even while the alarm is active. The monitoring state persists until either the alarm turns off, until the AI algorithm determines that the alarm is false and recommends to do nothing (act 110) or until the AI algorithm determines that the alarm indicates an actual state in which the DI tank should be replaced or exchanged (act 115).

Generation of the optimal site capacity prediction/recommendation by the AI algorithm may include analysing a water deionization system configuration at a site and treated water flow history and providing outputs of current site capacity and ideal site configuration. The current site capacity output accounts for data regarding historical exchanges, historical feed conductivity readings and how much water was used during an exchange cycle before a quality event occurs. Based on this data, the AI algorithm suggests what the system capacity should be considered to be. This is important because a customer may not be able to achieve an ideal site configuration due to local limitations.

The ideal site configuration output is a theoretical maximum site capacity for a site given the guidelines of a.) a minimum of one exchange per year or the fewest exchanges per year; and b.) no more than four worker tanks and one polisher tank allowed in a treatment system train. This is important because it will provide information allowing a customer or service provider to look at opportunities to become more efficient. Based on the ideal site configuration output for a site, a service provider may provide a suggestion to add more tanks at the customer's site. This would reduce the number of service visits for the site to be closer to a desired goal of one service visit per site per year. Based on the ideal site configuration output for a site, if the site is determined to have more DI capacity than recommended, a service provider may suggest removing one or more DI tanks to reduce inventory requirements or help with low flow performance at the site. Included in this algorithm is a targeted tank size for each site (for example, 1.2 or 3.6 cubic feet).

The optimal site capacity prediction/recommendation will allow a service provider to calculate savings based upon the number of trips eliminated. For sites than can implement the recommended configuration a hard savings can be documented by comparing previous exchange history with expected exchanges. For sites that cannot implement a change immediately, having the data can still be valuable. Circumstances may change at a site where implementing the recommendation becomes possible.

Figure 2A:
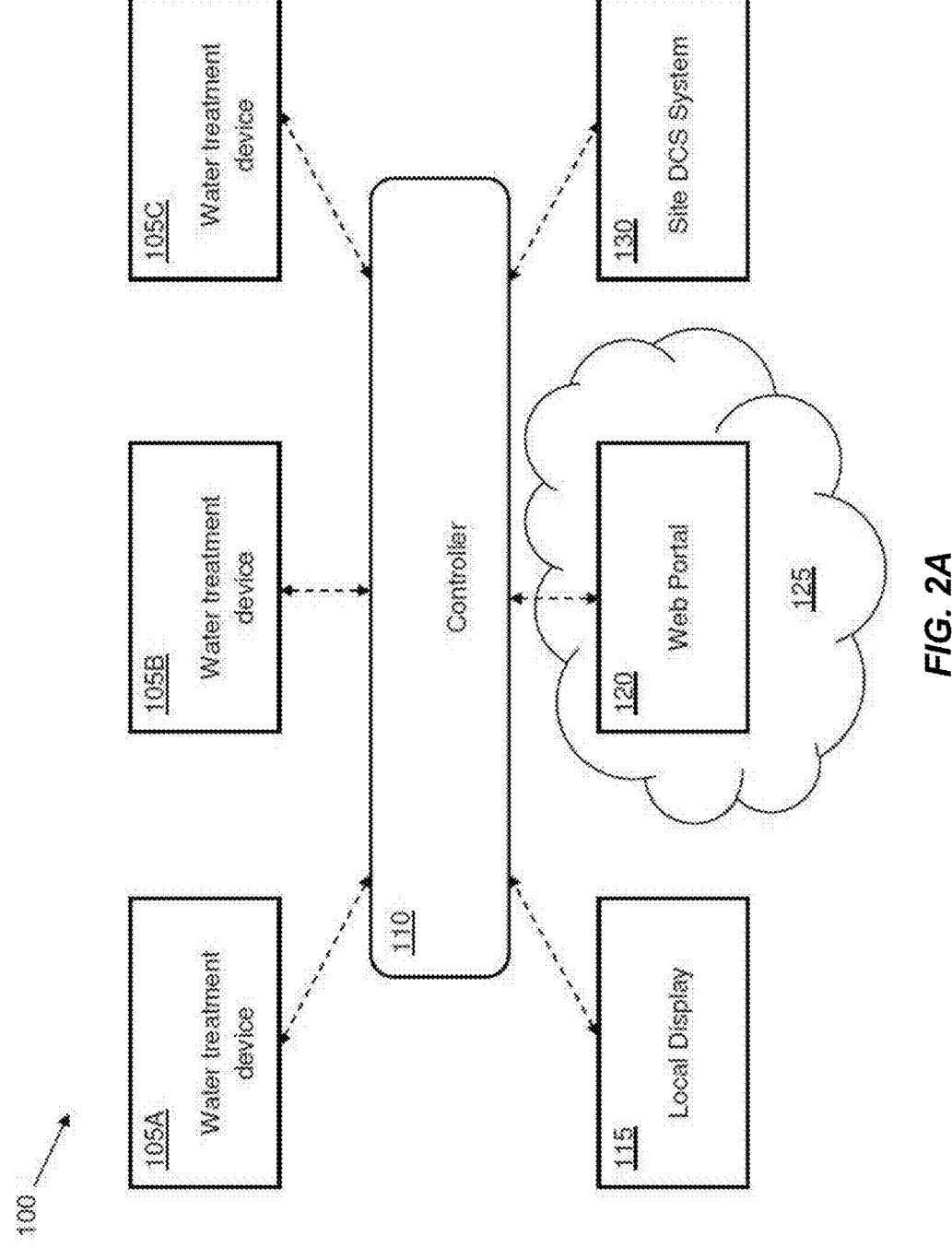
FIG. 2A is a schematic illustration of a water treatment system and associated monitoring system.
Figure 2B:
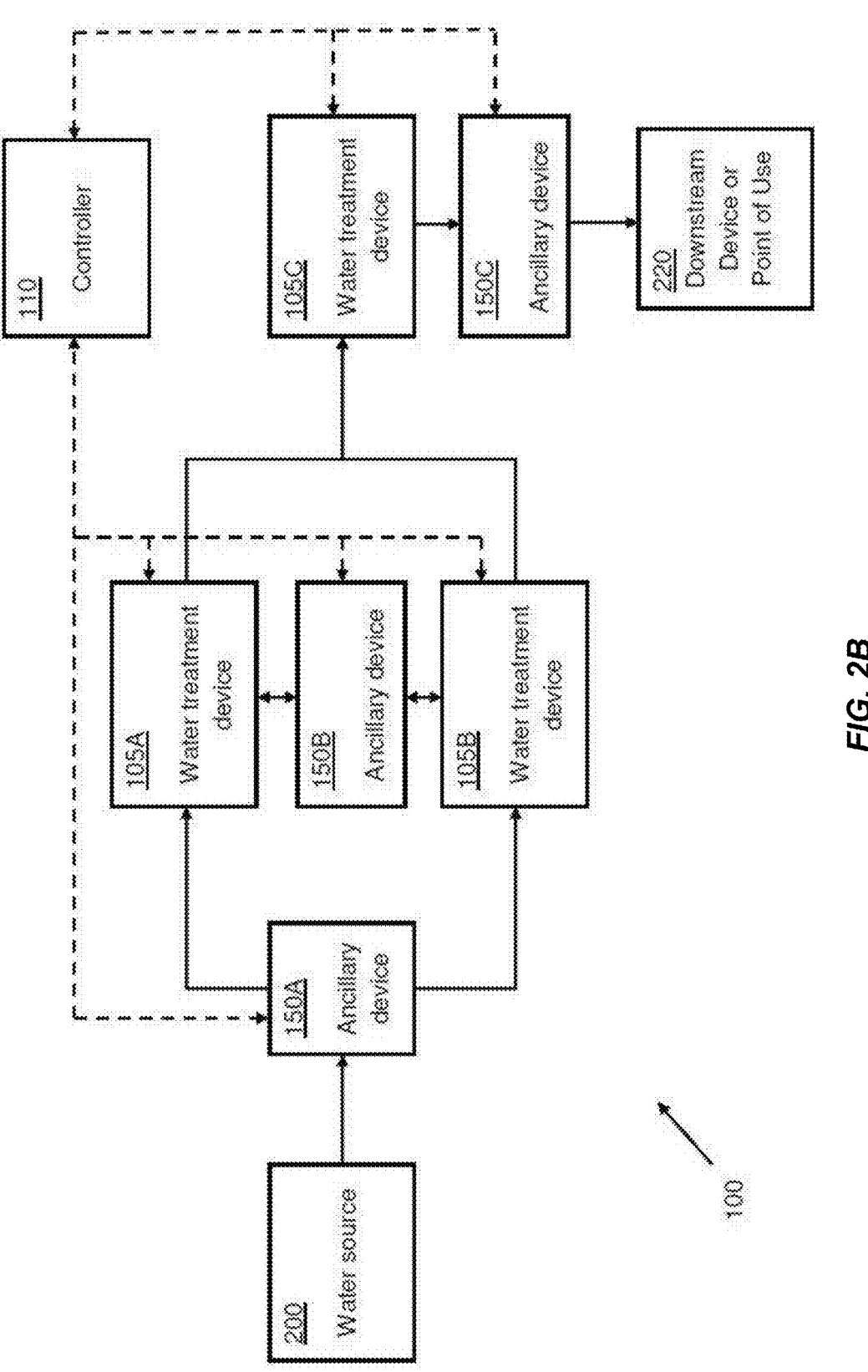
FIG. 2B is a schematic illustration of a water treatment system.

One embodiment of a water treatment system (also referred to herein as a water treatment unit) and associated monitoring system is illustrated schematically in FIG. 2A generally at 100. The water treatment system may include one or more water treatment units or devices 105A, 105B, 105C. The one or more water treatment devices may be arranged fluidically in series and/or in parallel as illustrated in FIG. 2B. Although only three water treatment devices 105A, 105B, 105C are illustrated, it is to be understood that the water treatment system may include any number of water treatment units or devices.

The water treatment system 100 may further include one or more ancillary systems 150A, 150B, 150C, for example, pumps, pre or post filters, polishing beds, heating or cooling units, sampling units, power supplies, or other ancillary equipment fluidically in line with or otherwise coupled to or in communication with the one or more water treatment units 105A, 105B, 105C. The ancillary systems are not limited to only three ancillary systems but may be any number and type of ancillary systems desired in a particular implementation. The one or more water treatment units 105A, 105B, 105C and ancillary systems 150A, 150B, 150C may be in communication with a controller 110, for example, a computerized controller, which may receive signals from and/or send signals to the one or more water treatment devices 105A, 105B, 105C and ancillary systems 150A, 150B, 150C to monitor and control same. The one or more water treatment devices 105A, 105B, 105C and ancillary systems 150A, 150B, 150C may send or receive data related to one or more operating parameters to or from the controller 110 in analog or digital signals. The controller 110 may be local to the water treatment system 100 or remote from the water treatment system 100 and may be in communication with the components of the water treatment system 100 by wired and/or wireless links, e.g., by a local area network or a data bus. A source of water to be treated 200 may supply water to be treated to the water treatment system 100. The water to be treated may pass through or be treated in any of the water treatment devices 105A, 105B, 105C and, optionally, one or more of the ancillary systems 150A, 150B, 150C and may be output to a downstream device or point of use 220. In some embodiments, the AI algorithm disclosed herein runs on the controller 110.

Returning to FIG. 2A, one or more sensors, probes, or scientific instruments associated with each of the water treatment devices 105A, 105B, 105C may be in communication, via a wired or a wireless connection, to a controller 110 which may include, for example, a local monitoring and data gathering device or system. The one of more sensors, probes or scientific instruments associated with each of the water treatment devices 105A, 105B, 105C may provide monitoring data to the controller 110 in the form of analog or digital signals. The controller 110 may provide data from the sensors or scientific instruments associated with each of the water treatment devices 105A, 105B, 105C to different locations. One of the locations may optionally include a display 115 local to one of the water treatment devices 105A, 105B, 105C or the site at which the water treatment devices 105A, 105B, 105C are located. Another of the locations may be a web portal 120 which may be hosted in a local or remote server or in the cloud 125. Another of the locations optionally may be a distributed control system (DCS) 130 which may be located at the site or at the facility at which the water treatment devices 105A, 105B, 105C are located. In some embodiments, the AI algorithm disclosed herein runs on the DCS 130 alternatively or in addition to the controller 110.

Processing of the data from the one or more sensors, probes, or scientific instruments associated with each of the water treatment devices 105A, 105B, 105C may be performed at the controller 110 and summarized data may be provided to one or more of the locations 115, 120, 130, or the controller 110 may pass raw data from the one or more sensors or scientific instruments or probes to one or more of the locations 115, 120, 130. The data may be available through one or more of the locations 115, 120, 130 to an operator of the water treatment system or any of the individual water treatment devices, to a user of treated water provided by the water treatment system, to a vendor or service provider that may be responsible for maintenance of one or more of the water treatment devices 105A, 105B, 105C or the system 100 as a whole, or to any other interested parties. For example, a user of the water treatment system 100 may access data related to water quality and/or quantity of treated water produced in the water treatment system 100 via the web portal 120 or via the site DCS system 130. The user may utilize such data for auditing purposes or to show compliance with regulations associated with production of the treated water. Further optional configurations contemplate storage of the raw or processed data or both at one or more data storage devices, at any of locations 110, 120 and 130.

Figure 3:
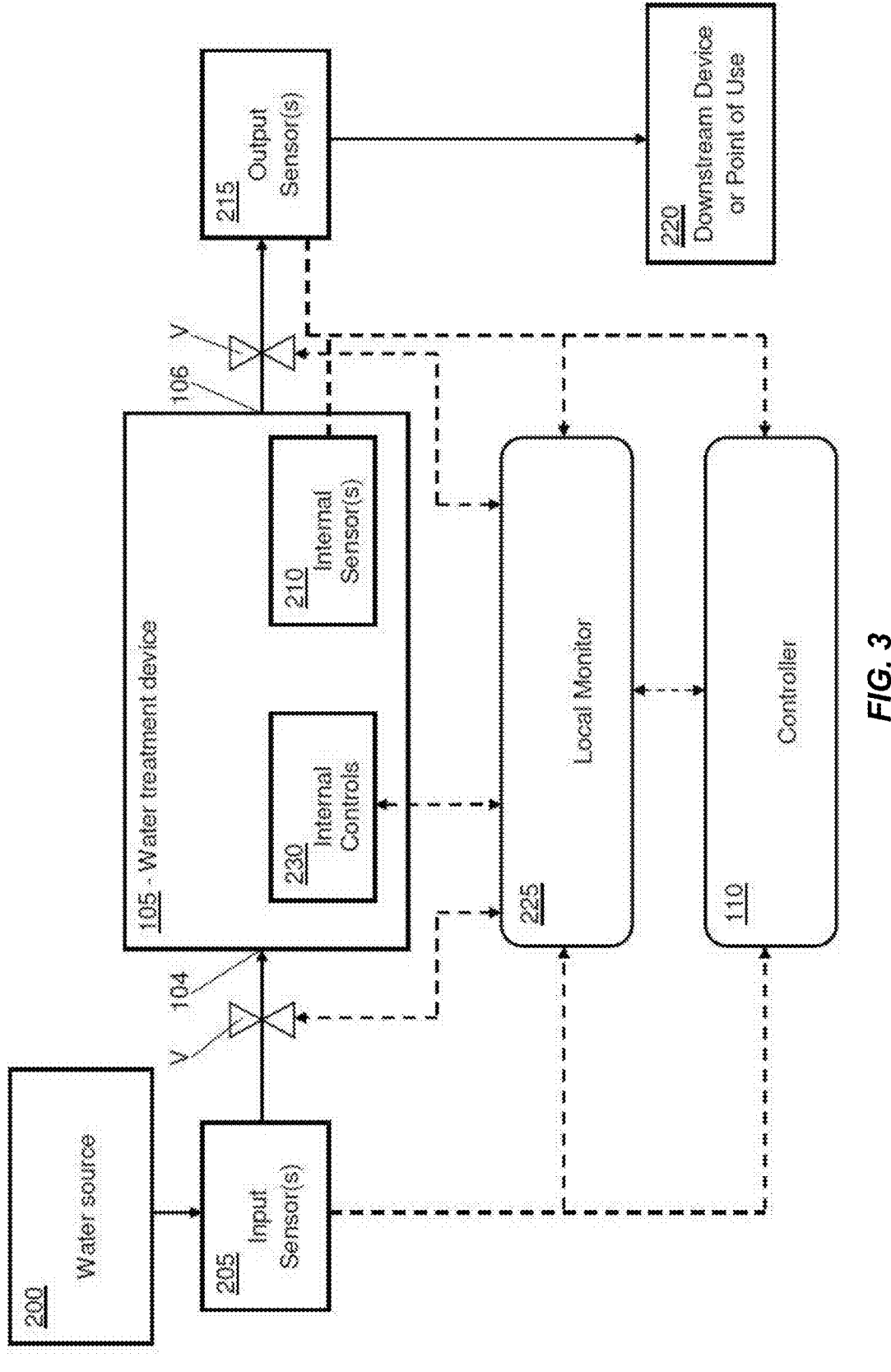
FIG. 3 is a schematic illustration of a water treatment system and associated monitoring system.

Features associated with the water treatment devices 105A, 105B, 105C are illustrated in FIG. 3, wherein an example of a water treatment device (which may be any one or more of water treatment devices 105A, 105B, 105C) is indicated at 105. A source 200 of water (alternatively referred to herein as feedwater) to be treated in the water treatment device 105 may be disposed in fluid communication upstream of the water treatment device 105. The source 200 may be a source of untreated water, water output from a plant or from a point of use at the site at which the water treatment device 105 is located, or an upstream water treatment device. The water to be treated may pass through or otherwise be monitored by one or more sensors 205 upstream of the inlet of the water treatment device 105. The one or more sensors 205 may include, for example, a flow meter, a conductivity sensor, a pH sensor, a turbidity sensor, a temperature sensor, a pressure sensor, an ORP sensor, or any one or more of the other forms of sensors described above. The one or more sensors 205 may provide data regarding one or more measured parameters of the water to be treated in the water treatment device 105 to a local monitor 225 associated with the water treatment device 105 which may pass the data on to the controller 110. The one or more sensors 205 may provide the data in either analog signals or digital signals. The local monitor 225 may be included as hardware or software in the controller 110 or may be a separate device. The one or more sensors 205 may additionally or alternatively provide data regarding the one or more measured parameters of the water to be treated in the water treatment device 105 directly to the controller 110.

The water to be treated may enter the water treatment device 105 through an inlet 104 of the water treatment device 105 and undergo treatment within the water treatment device 105. One or more sensors 210 may be disposed internal to the water treatment device 105 to gather data related to operation of the water treatment device 105 and/or one or more parameters of the water undergoing treatment in the water treatment device 105. The one or more sensors 210 may include, for example, a pressure sensor, level sensor, conductivity sensor, pH sensor, OPR sensor, current or voltage sensor, or any one or more of the other forms of sensors described above. The one or more sensors 210 may provide data related to operation of the water treatment device 105 and/or one or more parameters of the water undergoing treatment in the water treatment device 105 to the local monitor 225, which may pass the data on to the controller 110. The one or more sensors 210 may additionally or alternatively provide data related to operation of the water treatment device 105 and/or one or more parameters of the water undergoing treatment in the water treatment device 105 directly to the controller 110. Communications between the one or more sensors 210 and local monitor 225 and/or controller 110 may be via a wired or wireless communications link.

After treatment in the water treatment device 105 the treated water may exit though an outlet 106 of the water treatment device 105. One or more parameters of the treated water may be tested or monitored by one or more downstream sensors 215. The one or more sensors 215 may include, for example, a flow meter, a conductivity sensor, a pH sensor, a turbidity sensor, a temperature sensor, a pressure sensor, an ORP sensor, or any one or more of the other forms of sensors described above. The one or more sensors 215 may provide data regarding one or more measured parameters of the treated water to the local monitor 225, which may pass the data on to the controller 110. The one or more sensors 215 may additionally or alternatively provide data regarding the one or more measured parameters of the treated water directly to the controller 110. Communications between the one or more sensors 215 and local monitor 225 and/or controller 110 may be via a wired or wireless communications link. In some embodiments, the AI algorithm disclosed herein runs on the local monitor 225 alternatively to or in addition to the controller 110.

The local monitor 225 and/or controller 110 may include functionality for controlling the operation of the water treatment device 105. Based on measured parameters of the water to be treated or the treated water from the sensors 205 and/or 215, measured parameters from the one or more internal sensors 210, or based on a command received from an operator, the local monitor 225 and/or controller 110 may control inlet or outlet valves V (or one or more ancillary systems 150A, 150B, 150C illustrated in FIG. 2B) to adjust a flow rate or residence time of water within the water treatment device 105. The local monitor 225 and/or controller 110 may also control one or more internal controls 230 of the water treatment device 105 to adjust one or more operating parameters of the water treatment device 105, for example, internal temperature, pressure, pH, electrical current or voltage (for electrically-based treatment devices), aeration, mixing speed or intensity, or any other desired operating parameter of the water treatment device 105.

The local monitor 225 and/or controller 110 may monitor signals from one or more of the input sensors 205, internal sensors 210, and output sensors 215 to determine if an error condition or unexpected event has occurred and may be configured to generate and error message or signal in response to detecting same. For example, in instances in which the input sensors 205 and output sensors 215 include inlet and outlet pressure sensors, the local monitor 225 and/or controller 110 may be configured to receive inlet pressure data from the inlet pressure sensor and outlet pressure data from the outlet pressure sensor and generate an alarm if a difference in the pressure of the feedwater relative to the pressure of the treated water is above a differential pressure setpoint. In instances in which one or more of the input sensors 205, internal sensors 210, and output sensors 215 include a leak detection module disposed to close if moisture is detected in an enclosure of the water treatment unit 105, the local monitor 225 and/or controller 110 may be configured to generate an indication if the leak detection module detects moisture in the enclosure. In some embodiments, the leak detect module includes a sensor disposed externally or outside of but proximate the enclosure of the unit on a floor upon which the water treatment unit is set.

Figure 4:
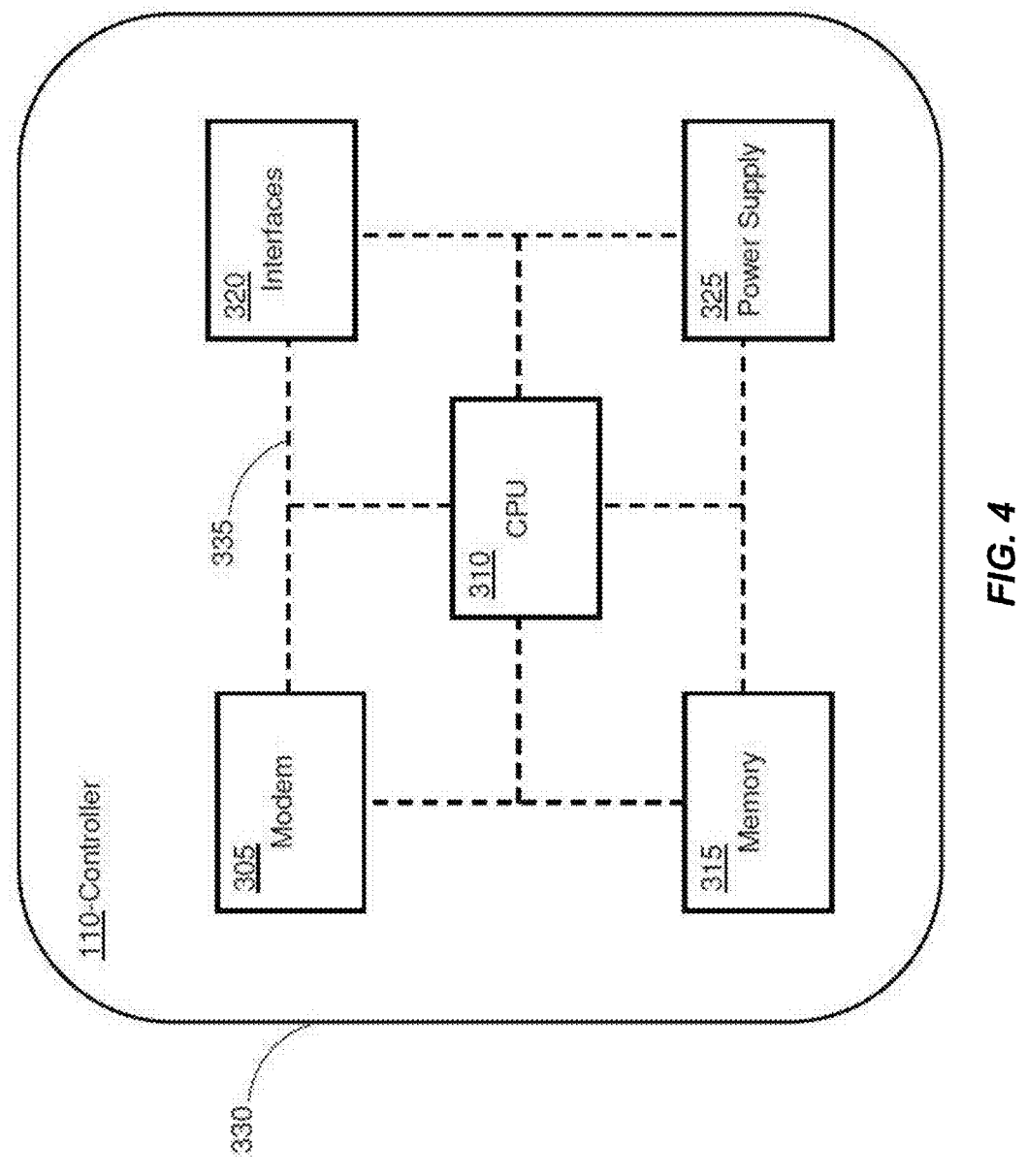
FIG. 4 is a schematic illustration of a data platform/monitoring system for a water treatment system.

In one embodiment, the monitoring system, represented by the controller 110 and illustrated in further detail in FIG. 4, may include one or more wired and/or wireless communication modules, such as modem 305 which may, for example, utilize a cellular phone network, e.g., based on the LTE Cat 1, LTE Cat M1, or Cat NB1 standard, to communicate data regarding operation of a water treatment device 105 and/or water to be treated and/or water after being treated in a water treatment device 105 with a remote server or one of locations 115, 120, 130, a processing unit (CPU) 310 operatively connected to the communication modules, such as modem 305, a memory 315 operatively connected to the CPU 310 which could be used to store data received from sensors associated with the water treatment devices and/or code for controlling the operation of one or more water treatment devices, one or more additional interfaces 320, which may include wired or wireless (e.g., Wi-Fi, Bluetooth®, cellular, etc.) modules for connecting one or more scientific instruments or any of sensors 205, 210, 215 or other sensors associated with a water treatment device 105 or system to the central processing unit, a power supply 325 for providing electrical power to the modem 305 and the central processing unit, and an enclosure 330 for housing the components at the location. In some embodiments, the one or more module 305 may include a Bluetooth® interface operatively configured to wirelessly transmit data over a personal area network, e.g., a short distance network in compliance with the IEEE 802.15.1 standard, or a utilize wireless local area network protocols, e.g., Wi-Fi based on the IEEE 802.11 standard. In some embodiments, the one or more interfaces 320 may include a Bluetooth® interface operatively configured to wirelessly transmit data over a personal area network, e.g., a short distance network in compliance with the IEEE 802.15.1 standard, or a utilize wireless local area network protocols, e.g., Wi-Fi based on the IEEE 802.11 standard. Any or all of the components of the controller 110 may be communicatively coupled with one or more internal busses 335. In some embodiments, the memory 315 may include a non-transitory computer readable medium including instructions, that when executed by the CPU 310, cause the CPU 310 to perform any of the methods disclosed herein.

A variety of monitoring devices such as a flow meter or other scientific instrument are normally operably connected to the CPU 310 such that data from the monitoring device or scientific instrument is transmitted to the modem 305 where it can be accessed from a remote location through, for example, the cellular phone network.

In one aspect of the disclosure, a remote monitoring and control system architecture is used as illustrated in FIG. 2A. A controller 110 comprising a modem 305 (FIG. 4) and cellular connectivity is connected to various devices, for example, one or more sensors (for example, any one or more of sensors 205, 210, 215) associated with water treatment devices 105A, 105B, and 105C. The one or more sensors may comprise a service deionization tank resistivity monitor, a series of sensors and monitors such as a flow meter, conductivity meter, temperature and pH sensors for a water purification system such as a reverse osmosis system, or the one or more sensors may comprise a series of unit operations combined into a complete system. The information from the various one or more sensors is uploaded to internal portals from the operating business and can also be uploaded to customer portals and customer DCS systems 130. The entire network may be cloud based.

One example of a local water treatment system or unit 100 that may be included in aspects and embodiments disclosed herein is a service deionization system. One example of a local water treatment system or unit 100 including a service deionization system is illustrated generally at 400 in FIG. 5. Water to be treated is supplied from a source 405 of water to an inlet pressure relief valve 410. The inlet pressure relief valve 410 regulates inlet water pressure to prevent overpressurization and potential system damage. The inlet water then passes through a solenoid valve 415 and passes through a pre-filter 420. The pre-filter 420 removes particulate matter that may be present in the inlet water from the source 405. A first flow meter 425 monitors the flow of the inlet water from the pre-filter 420. An inlet water quality probe S1 is in fluid communication with inlet water exiting the pre-filter 420. The inlet water quality probe S1 includes a conductivity sensor and a temperature sensor. Conductivity of the inlet water may depend on both concentration of ionic species in the inlet water and temperature of the inlet water. The temperature sensor may provide data utilized to apply an offset or calibration to data output from the conductivity sensor to reduce or eliminate the effect of temperature on the conductivity sensor readings. In some embodiments, the raw conductivity readings from the inlet water conductivity sensor may be linearly adjusted for temperatures different from a reference temperature of 25° C. by a temperature coefficient, such as 2.0% per degree C.

The inlet water flows from the first flow meter 425 to a first treatment column 430 which may be, for example, a carbon filtration column. The water is treated in the first treatment column 430, exits the first treatment column 430, and enters a second treatment column 435 which may be, for example, a cation resin ion exchange column.

After being treated in the second treatment column 435 the water exits the second treatment column 435 and enters a third treatment column or worker bed 440. The worker bed 440 may include, for example, an anion resin ion exchange column. A worker probe S2 is disposed to measure at least one worker water parameter of water from the worker bed 440. The worker probe S2 may include a conductivity sensor and a temperature sensor for providing temperature calibration for data output from the conductivity sensor of the worker probe S2, as described above with reference to the inlet water quality probe S1. In some embodiments, the raw conductivity readings from the worker bed water conductivity sensor may be linearly adjusted for temperatures different from a reference temperature of 25° C. by a temperature coefficient, e.g., 4.3% per degree C. The temperature coefficient can be adjusted locally, at the unit or remotely, from the central server. The worker probe S2 may be provided on the output of the worker bed 440 to measure the quality of water exiting the worker bed 440. The worker probe S2 may include an indicator light or display (not shown) that provides an indication of whether the conductivity of the water exiting the worker bed 440 is within acceptable limits. In other cases, nonlinear temperature compensation may be utilized to adjust the conductivity value.

The water is treated in the worker bed and exits the worker bed 440 and enters a polisher bed 445 which may be, for example, a mixed bed resin ion exchange column. A polisher probe S3 is disposed to measure at least one polisher water parameter of water from the polisher bed 445. The polisher probe S3 may include a conductivity sensor and a temperature sensor for providing temperature calibration for data output from the conductivity sensor of the polisher probe S3, as described above with reference to the inlet water quality probe S1. In some embodiments, the raw conductivity readings from the polisher bed water conductivity sensor may be linearly adjusted for temperatures different from a reference temperature of 25° C. by temperature coefficient, e.g., 5.2% per degree C. The temperature coefficient can be adjusted locally, at the unit or remotely, from the central server. The polisher probe S3 may be provided on the output of the polisher column 445 to measure the quality of water exiting the polisher column 445. The polisher probe S3 may include an indicator light or display (not shown) that provides an indication of whether the conductivity of the water exiting the polisher column 445 is within acceptable limits. The water is treated in the polisher column 445 and exits the polisher column 445. The water exiting the polisher column 445 may pass through a post filter 450, which may be, for example, a column filter that filters any resin fines from the treated water. A second flow meter 425 may be provided downstream of the polisher bed 445. The second flow meter 425 may be provided in addition to or as an alternative to the first flow meter 425.

A monitor/controller 455, which may include features of one or both of the local monitor 225 and/or controller 110 illustrated in FIG. 3, may be utilized to monitor and control aspects of the system or unit 400. The monitor/controller 455 may, for example, receive a signal from a leak detector module 460 that may provide an indication of a leak being present in the system or unit 400. For, example, the leak detector module 460 may be disposed to close if moisture is detected in an enclosure 465 of the service deionization system 400 or on a floor or other surface upon which the enclosure 465 or the system 400 is disposed. The monitor/ controller 455 may be configured to generate an indication, alarm, or warning if the leak detection module 460 detects moisture in the enclosure 465. If a leak is detected, the monitor/controller 455 may send a control signal to the solenoid valve to 415 to shut down flow of water through the system. The monitor/controller 455 may also provide a signal by a wired or wireless connection to a service provider to indicate that the system 400 may be in need of service. The monitor/controller 455 may be configured to receive and monitor flow rate data via signals received from one or both of the first and second flow meters 425 and may be configured to receive and monitor at least one measured inlet water parameter from the inlet water quality probe S1, at least one worker water parameter from the worker probe S2, and at least one polisher water parameter from the polisher probe S3. The probes S1, S2, and/or S3 may provide conductivity measurements to the monitor/controller 455 at a periodic rate, for example, once every five seconds, or continuously. Data from the probes S1, S2, and/or S3 may be logged by the monitor/controller 455 on a periodic basis, for example, once per five minutes. If the flow rate or water quality measurements are outside an acceptable range the monitor/controller 455 may provide a signal by a wired or wireless connection to a service provider to indicate that the system 400 may be in need of service, for example, that the resin in one of the worker bed 440 or polisher bed 445 may be depleted and in need of replacement or that one of the filters 420, 450 may be clogged and in need of service.

Figure 6:
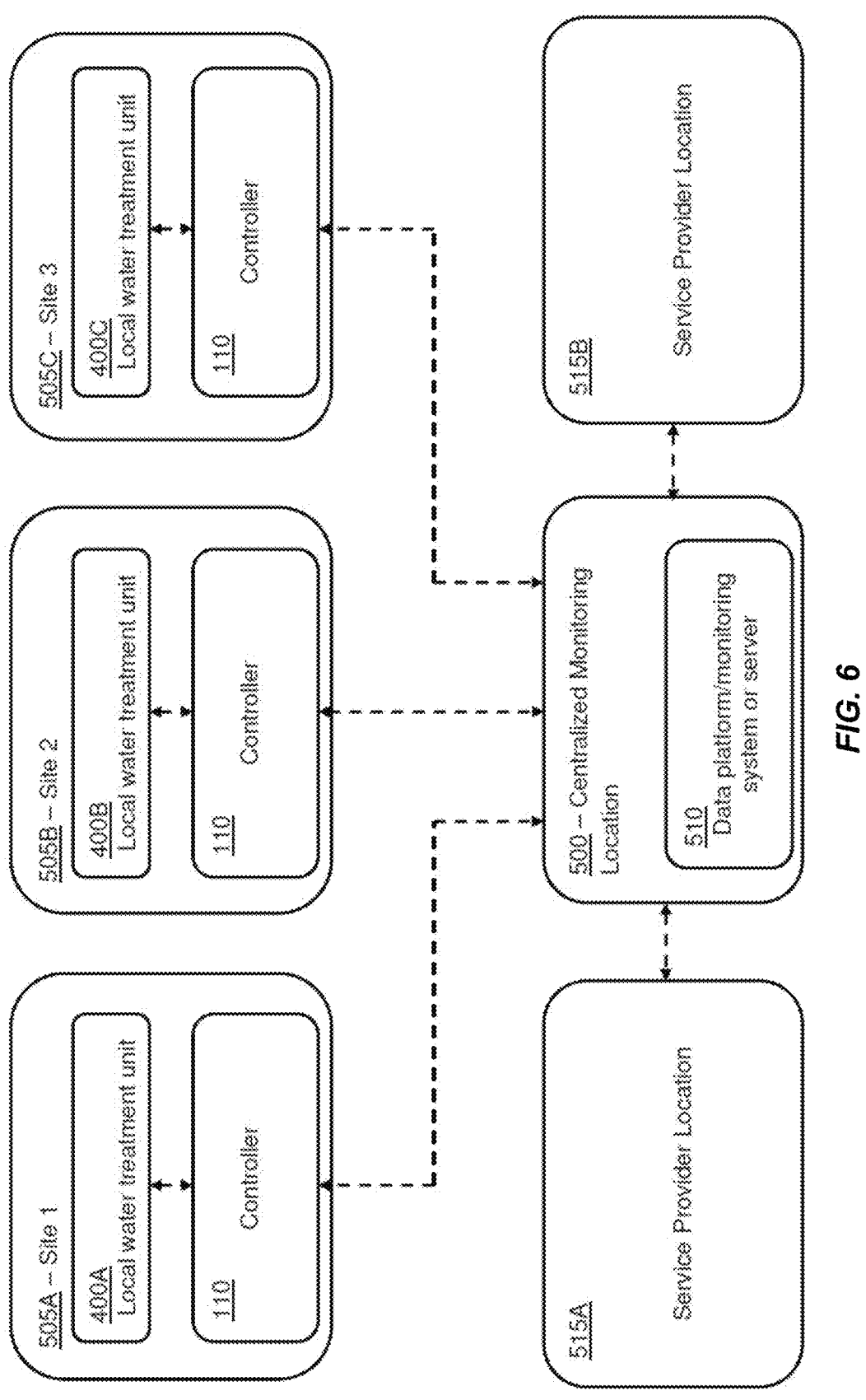
FIG. 6 is a schematic illustration of a water treatment system service.

The water treatment unit 400 (for example, the monitor/controller 455 of the water treatment system 400) may be in communication with a server, for example, server 510 at a centralized monitoring location 500 as illustrated in FIG. 6. The server 510 may be configured to receive from the local water treatment unit, at least one of the flow data, the at least one measured inlet water parameter, the at least one worker water parameter, and the at least one polisher water parameter. In some embodiments, the AI algorithm disclosed herein runs on the server 510 alternatively to or in addition to the controller 110 and/or local monitor 225 and/or monitor/controller 455.

At least one of the controller 455 and the server 510 may be further configured to determine at least one of a cumulative flow total based on an aggregate of the flow data from one or both of the first and second flow meters 425, a billing cycle flow total based on the flow data during a billing cycle through the local water treatment unit 400, a current exchange flow total based on the flow data during a current service period of the worker bed, a weighted daily average flow rate as defined below, a contaminant load based on the at least one inlet water parameter, and a remaining capacity of the local water treatment unit based at least on the contaminant load.

Additional sensors, for example, pressure differential sensors associated with the filters 420, 450, a flow sensor or flow totalizer associated with the inlet pressure relief valve 410 or first or second flow meters 425 may also be present and in communication with the monitor/controller 455, local monitor 225, and/or controller 110.

Certain aspects of the present disclosure are directed to a system and method for providing a service that allows delivery of a water product in accordance with specific quality requirements. In some instances, the product offering, e.g., the water product, is delivered and/or consumed by a user without the user operating any product treatment systems, e.g., without operating a water treatment system, and directly consumes the water product having predefined quality characteristics. In some instances, certain aspects of the disclosure allow acquisition of a user's consumption behaviour of the product, e.g., water consumption, and such data or information can then be utilized by the system owner or service product provider to adjust, repair, replace, or maintain, any component, subsystem, or parameter of, for example, the water treatment system. For example, one or more local treatment units or systems can be disposed or located at a user's facility with a plurality of ion exchange columns having a plurality of sensors or probes that monitor one or more characteristics thereof and/or one or more parameters of the raw, inlet water or feedwater, the outlet, service product water, and/or water exiting any of the ion exchange columns. Data can thus be transmitted from the one or more treatment systems, e.g., at the users point of use, to an information or data storage or housing facility, typically away from the user's facility, or remotely from the water treatment system. Data or information acquired, transmitted and/or stored can include, for example, properties of the inlet water or the produced water quality, e.g., conductivity, pH, temperature, pressure, concentration of dissolved solids, oxidation reduction potential, or flow rate. Data acquired, transmitted, and/or stored can also include operating parameters of the one or more treatment systems. For example, the one or more treatment systems can deliver a deionized water product wherein the treatment system includes an ion exchange subsystem and the data can include any one or more of pressure, both inlet and outlet, flow rate, run-time, ion exchange bed operating or service duration, or alarm conditions. Other information can include subsystem characteristics such as remote transmitter signal strength, ion exchange bed pressure, and/or differential pressure.

With respect to an exemplary treatment system, the system can comprise ion exchange beds or columns of cation exchange resin, anion exchange resin, or a mixture of cation and anion exchange resin. The process can involve delivering water having a predetermined quality, e.g., a predetermined conductivity, for a predetermined period, e.g., hourly, daily, weekly, monthly, quarterly, semi-annually. For example, the process can provide a user with deionized water having a purity that is suitable for semiconductor manufacturing operations. The delivered water can be deionized at the user's facility by the one or more treatment systems even if the treatment system is not owned or operated by the user. The system's owner may provide the treatment system at the user's facility, connect the treatment system to a source of water, operate the treatment system, monitor the operating parameters of the treatment system, and deliver the treated, deionized water to the user. The system owner may receive information or data regarding the treatment system parameters and deionized water properties from the treatment system and store such data. The owner may monitor the system and proactively service or replace any subsystem or subcomponent of the treatment system without user interaction. The owner or operator of the treatment system thus provides a water product to the user without user interaction. For example, if data from the treatment system indicates that one or more of the ion exchange columns requires replacement, or is about to reach the end of its useful life, the owner or operator can, without user interaction, replace any of the columns of the treatment system. In exchange, the owner or operator is compensated by the user based on water consumption. Alternatively, the user can compensate the owner or operator according to a subscription, e.g., a daily, weekly, or monthly subscription for use and availability of the deionized water product.

Although a deionized product water treated by ion exchange columns was exemplarily described, other systems can be implemented as well. For example, the one or more treatment systems can utilize reverse osmosis (RO) apparatus. The owner or operator can remotely monitor the RO apparatus to ensure delivery and quality of a water product, replace RO membranes or columns, pumps, and/or filters, of the RO apparatus. In exchange, the user can compensate owner/operator based on quantity of produced water consumed, or according to a periodic subscription.

A centralized monitoring location, illustrated generally at 500 in FIG. 6 may receive data from one or more local water treatment systems, for example, from controllers 110 (and/or monitor/controllers 455, or local monitors 225) associated with local water treatment units or systems 400A, 400B, 400C at a plurality of different sites 505A, 505B, 505C. The local water treatment unit or system 400A located at one of the sites, for example, site 505A may be or may include the local water treatment unit or system 400 illustrated in FIG. 5. Another of the sites may include a second local water treatment unit or system 400B. The second local water treatment unit or system 400B may include unit operations similar to or corresponding to those of the local water treatment unit or system 400A, for example, a second inlet water quality probe (corresponding to inlet water quality probe S1 of treatment unit 400) disposed to measure at least one inlet water parameter of a second feedwater to be treated in the second local water treatment unit, the second inlet water quality probe including a second conductivity sensor and a second temperature sensor, a second worker bed (corresponding to worker bed 440 of treatment unit 400) having ion exchange media contained therein, and disposed to receive the second feedwater to be treated, a second worker probe (corresponding to worker probe S2 of treatment unit 400) disposed to measure at least one water parameter of water from the second worker bed, the second worker probe including a second worker conductivity sensor and a second worker temperature sensor, a second polisher bed (corresponding to polisher bed 445 of treatment unit 400) having ion exchange media contained therein, and fluidly connected downstream from the second worker bed, and a second polisher probe (corresponding to polisher probe S3 of treatment unit 400) disposed to measure at least one polisher water parameter of water from the second polisher bed, the second polisher probe including a second polisher conductivity sensor and a second polisher temperature sensor. A second flow meter (corresponding to first or second flow meter 425 of treatment unit 400) is positioned at least one of upstream the second worker bed and downstream of the second polisher bed and configured to measure flow data of water introduced into the second local water treatment unit. A second controller (corresponding to controller 455 of treatment unit 400) is in communication with the second flow meter, the second inlet water quality probe, the second worker probe, and the second polisher probe. The second controller is configured to receive the flow data from the second flow meter, the at least one measured inlet water parameter from the second inlet water quality probe, the at least one worker water parameter from the second worker probe, and the at least one polisher water parameter from the second polisher probe.

The second water treatment system 400B, like the water treatment system 400, may be in communication with the server 510 at the centralized monitoring location 500. The server 510 may be further configured to receive from the second local water treatment unit, at least one of the flow data from the second flow meter, the at least one measured inlet water parameter from the second inlet water quality probe, the at least one worker water parameter from the second worker probe, and the at least one polisher water parameter from the second polisher probe.

At least one of the controller 455 of local water treatment system 400 and the server 510 may be further configured to determine at least one of a cumulative flow total based on an aggregate of the flow data from one or both of the first and second flow meters 425, a billing cycle flow total based on the flow data during a billing cycle through the local water treatment unit 400, a current exchange flow total based on the flow data during a current service period of the worker bed, a weighted daily average flow rate of water through the local water treatment unit 400, a contaminant load based on the at least one inlet water parameter, and a remaining capacity of the local water treatment unit based at least on the contaminant load.

A second controller at the second water treatment unit 400B, which may be substantially similar to and correspond to the controller 455 of local water treatment system 400 may be configured to determine at least one of a cumulative flow total of the second water treatment unit based on an aggregate of the flow data through the water second water treatment unit, a second billing cycle flow total based on the flow data during a billing cycle through the second water treatment unit, a current exchange flow total based on the flow data during a current service period of the second worker bed, a second weighted daily average flow rate of water through the second water treatment unit, a second contaminant load based on the at least one inlet water parameter of the second feedwater, and a remaining capacity of the second local water treatment unit based at least on the second contaminant load.

Data from any of the units 400A, 400B, and 400C can be collected and respectively stored in a memory device operatively connected to each of the respective controllers 110 and continuously transmitted through wired or wireless communication protocols or a combination thereof to server 510. Typically, however, data at each unit is stored and accumulated during a predetermined collection period and then transmitted intermittently to server 510. For example, data regarding the various operating parameters can be continually or continuously collected and stored in the memory device, the controller can periodically, e.g., every five minutes, hourly, once or twice each day, transmit through the modem to a receiving modem operatively connected via an internet connection to server 510 whereat the accumulated data can be stored and analysed. In other configurations, certain data types, such as alarms and associated notifications, may be preferentially transmitted immediately.

The centralized monitoring location 500 may analyze the data provided by the different controllers 110 to determine when one or more water treatment devices 105 in the water treatment systems at the different sites 505A, 505B, 505C should be serviced. The centralized monitoring location 500 may create a schedule for service of the one or more water treatment devices 105 in the water treatment systems at the different sites 505A, 505B, 505C and communicate service schedules to one or more service provider locations 515A, 515B.

Figure 5:
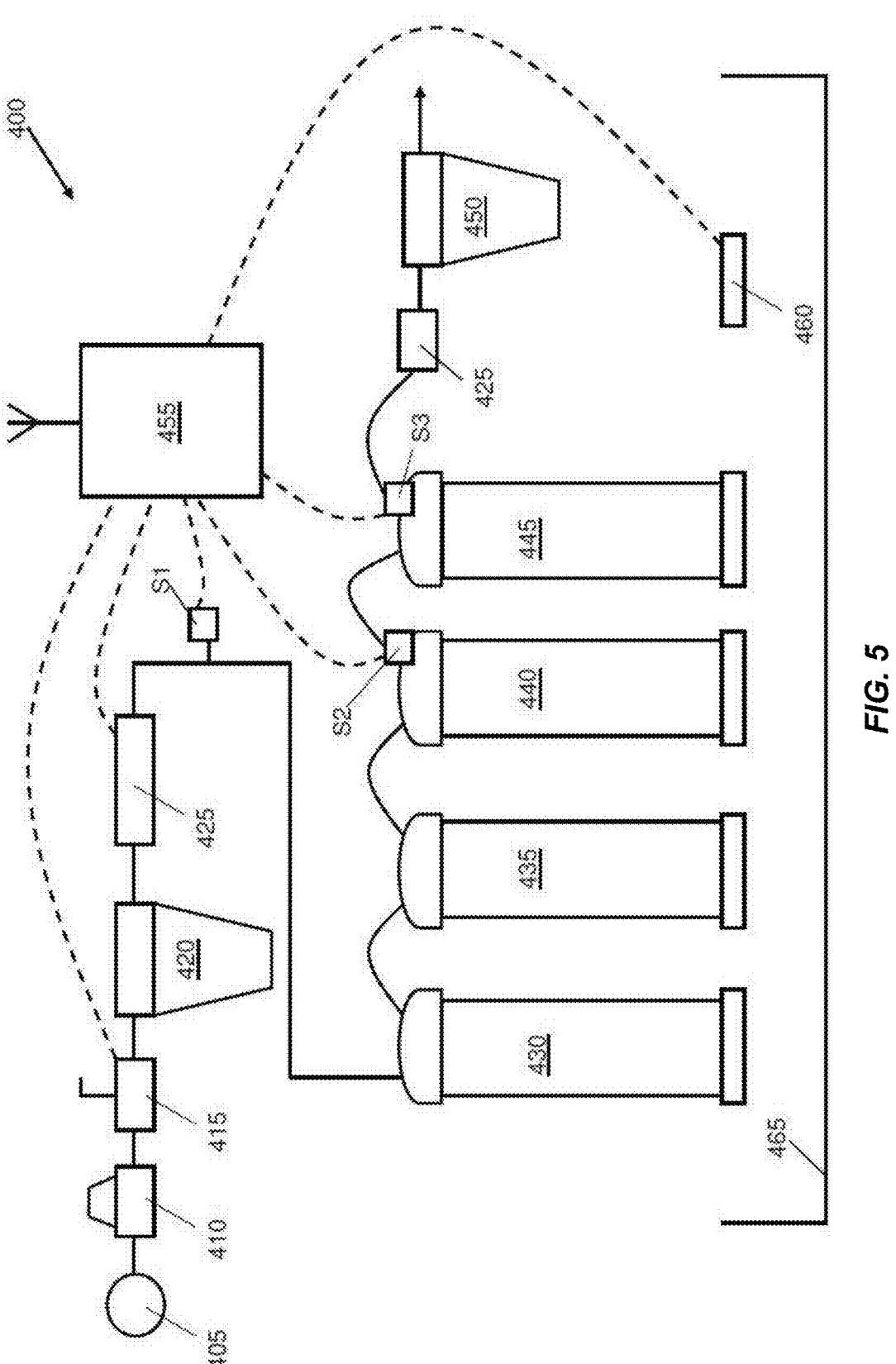
FIG. 5 is a schematic illustration of a service deionization water treatment system.

In some embodiments, a system for providing treated water includes a first water treatment unit, for example, local water treatment unit 400A illustrated in FIG. 6. The first water treatment unit includes a first ion exchange bed having ion exchange media contained therein, for example, any of the ion exchange columns or beds 430, 435, 440, or 445 illustrated in FIG. 5. The first ion exchange bed is disposed to receive a first water stream to be treated, for example, water from the source of water to be treated 405 in FIG. 5. A first flow meter, for example, either of flow meters 425 in FIG. 5, is positioned along a flow path including the first ion exchange bed and configured to measure a first flow rate of the first water stream passing through the first flow path. A first controller, for example, controller 110 of FIG. 2A, 2B, or 4 or monitor/controller 455 of FIG. 5 is in communication with the first flow meter. The first controller is configured to receive first flow rate data regarding the first flow rate, calculate, based on the first flow rate data, a first current average flow rate of the first water stream through the first ion exchange bed after a replacement of the ion exchange media at a first time, calculate a first cumulative average flow rate through the first water treatment unit, determine a first weighted average flow rate from a weighted average of the first current average flow rate and the first cumulative average flow rate, and determine an estimated number of days remaining to exhaustion of the ion exchange media in the first ion exchange bed based on the first weighted average flow rate and a capacity of the ion exchange media of the first ion exchange bed.

In some embodiments, the first controller is configured to determine the first weighted average flow rate by applying a greater weighting to the first current average flow rate than a weighting applied to the first cumulative average flow rate. The first controller may be configured to determine the first weighted average flow rate by performing a calculation as follows:

$$\text{first weighted average flow rate} = A \times (\text{first cumulative average flow rate}) + B \times (\text{first current average flow rate}), \text{ wherein } 0.5 < A < 0.9, \ 0.1 < B < 0.5, \text{ and } A + B = 1. \quad (1)$$

The first controller may be further configured to schedule a second replacement of the ion exchange media at a second time determined from the estimated number of days remaining until the ion exchange media will be exhausted.

The system for providing treated water may further include a second water treatment unit, for example, local water treatment unit 400B illustrated in FIG. 6, disposed remotely from the first water treatment unit. The second water treatment unit includes a second ion exchange bed having ion exchange media contained therein, for example, any of the ion exchange columns or beds 430, 435, 440, or 445 illustrated in FIG. 5. The second ion exchange bed is disposed to receive a second water stream to be treated, for example, water from the source of water to be treated 405 in FIG. 5. A second flow meter, for example, either of flow meters 425 in FIG. 5, is positioned along a second flow path including the second ion exchange bed and is configured to measure a second flow rate of the second water stream passing through the second flow path. A second controller for example, controller 110 of FIG. 2A, 2B, or 4 or monitor/controller 455 of FIG. 5, is in communication with the second flow meter. The second controller is configured to receive second flow rate data regarding the second flow rate, calculate, based on the second flow rate data, a second current average flow rate of the second water stream through the second ion exchange bed, calculate a second cumulative average flow rate through the second water treatment unit, determine a second weighted average flow rate from a weighted average of the second current average flow rate and the second cumulative average flow rate, and determine a second estimated number of days remaining to exhaustion of the ion exchange media in the second ion exchange bed based on the second weighted average flow rate and a capacity of the ion exchange media of the second ion exchange bed.

In some embodiments, the second controller is configured to determine the second weighted average flow rate by performing a calculation as follows:

$$\text{second weighted average flow rate} = C \times (\text{second cumulative average flow rate}) + D \times (\text{second current average flow rate}), \text{ wherein } 0.5 < C < 0.9, 0.1 < D < 0.5, \text{ and } C + D = 1. \qquad (2)$$

It has been empirically determined that values of B and D in equations (1) and (2), respectively, of about 0.3 provide good results when using the weighted average flow rate to determine a remaining useful lifetime or estimated time until exhaustion of an ion exchange media bed or ion exchange column in water treatment systems as disclosed herein.

A central controller, for example, the monitoring system or server 510 of FIG. 6, is located at a site remote from first water treatment unit and is disposed to receive the estimated number of days remaining to exhaustion of the ion exchange media in the first ion exchange bed. The central controller is further configured to receive the second estimated number of days remaining to exhaustion of the ion exchange media in the second ion exchange bed and determine whether to replace the ion exchange media in the first ion exchange bed and ion exchange media in the second ion exchange bed in a same service trip. A "same service trip" as the term is used herein may include technicians departing from a service provider location with sufficient materials to travel to and service, for example, replace ion exchange media (or ion exchange cartridges), in multiple ion exchange systems, optionally at different treatment system locations, prior to returning to the service provider location.

The central controller is configured to determine whether to replace the ion exchange media in the first ion exchange bed and the ion exchange media in the second ion exchange bed in the same service trip by weighing a cost associated with regenerating the ion exchange media of the first ion exchange bed and the ion exchange media of the second ion exchange bed against a cost associated with different service trips to each of the first and the second sites. For example, if one or both of the ion exchange media in the first ion exchange bed and the ion exchange media in the second ion exchange bed are not fully exhausted, it may require an extra $X in chemical and labor costs to regenerate the ion exchange media from the first and second ion exchange beds than it might cost to regenerate the media if it were fully exhausted. Fuel and labor costs for separate service trips to the locations of the first and second ion exchange beds may be $Y. Fuel and labor costs for travel to the locations of the first and second ion exchange beds and for servicing of same in the same service trip may be $Z. If the cost savings associated with combining the service trips is greater than the extra cost to regenerate the ion exchange media, e.g., if $Y–$Z>$X, it may be economically beneficial to service both the first ion exchange bed and the second ion exchange bed in the same service trip rather than in different service trips. In some cases, the central controller may schedule replacement of a second ion exchange media (or cartridge) at a second location, even before a determination of bed exhaustion, as part of a same service request for replacement of a first ion exchange bed (or cartridge) at a first location if the level of exhaustion of the second ion exchange media is within a threshold number of days.

In some embodiments, a water treatment system includes a central server, for example, the monitoring system or server 510 of FIG. 6, and a plurality of water treatment units, each water treatment unit disposed remotely from the central server, for example, local water treatment units 400A, 400B, and/or 400C of FIG. 6. Each respective local water treatment unit includes ion exchange media, for example, ion exchange media disposed in any of the ion exchange columns or beds 430, 435, 440, or 445 illustrated in FIG. 5. The ion exchange media is disposed to receive water to be treated, for example, water from the source of water to be treated 405 in FIG. 5 and provide treated water. At least one flow meter, for example, either of flow meters 425 in FIG. 5, is disposed to monitor flow of water in the water treatment unit. The water treatment system further includes a controller, for example, controller 110 of FIG. 2A, 2B, or 4 or monitor/controller 455 of FIG. 5 that is configured to determine, for a predetermined period, an unadjusted flow rate of water through the water treatment unit, determine a historical flow rate of water through the water treatment unit, determine, for the ion exchange media, at least one of an expected remaining service capacity and a predicted days to exhaustion based on the unadjusted flow rate, the historical flow rate, and a total capacity of the ion exchange media, and transmit at least one of the expected remaining service capacity and the predicted days to exhaustion to the central server.

Each of the water treatment units of the water treatment system may further comprises a conductivity sensor, for example, one of the input sensors 205 of FIG. 3 or one of sensors S1 or S2 of FIG. 5, disposed to respectively measure a conductivity of water introduced into the ion exchange media of each respective water treatment unit. The controller may be further configured to adjust at least one of the predicted days to exhaustion and the total capacity of the respective ion exchange media based on the measured conductivity from the conductivity sensor.

The central server may be configured to generate a service request to replace ion exchange media in a particular water treatment unit if the predicted days to exhaustion of the particular water treatment unit is less than a service lag time. The service request may include a request for replacement of ion exchange media in an ion exchange column or replacement of the ion exchange column (or cartridge) as a whole. Responding to a service request may involve generating a service order ticket, determining a desired time for performing the service activities, and contacting a customer to schedule the service trip.

The central server may be configured to generate a service request to replace the respective ion exchange media in a particular water treatment unit if the remaining capacity of the particular water treatment unit is less than a minimum capacity. The central server may be further configured to combine at least two service requests from at least two different water treatment units into single aggregated service request to replace respective ion exchange media of the at least two water treatment units if a separation distance between the at least two water treatment units is less than a maximum separation distance.

The time between instances of service to replace ion exchange media in an ion exchange column may be calculated based on a water quality parameter such as concentration of ionic contaminants in influent water to be treated and a flow rate of water through the water treatment system. A conductivity sensor (e.g., one of the input sensors 205 illustrated in FIG. 3 or one of sensors S1 or S2 in FIG. 5) may be utilized to measure the concentration of ionic contaminants in the influent water to be treated. A flow sensor (e.g., another of the input sensor 205 illustrated in FIG. 3 or the output sensors 215 or internal sensors 210 illustrated in FIG. 3 or one of the flow meters 425 of FIG. 5) may be utilized to measure the flow rate of water being treated in the water treatment system at the user's site. Based on measurements from the conductivity sensor and the flow sensor(s) in the water treatment system, the service provider may determine a frequency at which the ion exchange column(s) should be serviced. The capacity of the ion exchange columns is based on the types of resin used and the amount of resin used. The capacity is expressed in grains. The total amount of water that can be treated is based on the capacity of the ion exchange columns and contaminant load in the feedwater as expressed by its conductivity. The conversion equations are as follows:

$$Conductivity\ (uS/CM) \times Cond\_TDS\_Conv\_Factor = Total\ Dissolved\ Solids\ (TDS)(units\ are\ PPM) \qquad (3)$$

$$TDS/PPM\_GPG\_Conv\_Factor = Contaminant\_Load \\ (units\ are\ grains/gallon) \qquad (4)$$

The Cond_TDS_Conv_Factor and PPM_GPG_Conv_Factor factors in the above equations may be empirically determined.

In some configurations, capacity calculations may begin (or may be reset) when the ion exchange columns are exchanged. When water begins flowing through the ion exchange columns the feedwater conductivity is converted to Contaminant_Load per equations (3) and (4) above. Each gallon of water that flows reduces the ion exchange column capacity by gallons flowed×Contaminant_Load. At the beginning of each day, the system computes the projected days left until ion exchange column exhaustion (Projected Days Left) by using the previous days average conductivity, the 10 day average flow total and current remaining capacity per the following equation:

$$(CurrentRemainingCapacity/ \\ (AverageDailyConductivity*Cond\_TDS\_Conv\_Factor/ \\ PPM\_GPG\_Conv\_Factor))/ \\ 10DayAverageFlowTotal = ProjectedDaysLeft \qquad (5)$$

The projected days left is compared to a projected days alarm setpoint. If it is less than the setpoint and a projected days left alarm is generated.

If the percent of remaining capacity is less than a remaining capacity alarm setpoint, a remaining capacity alarm is generated.

Alternatively, capacity determination may be based on a historically weighted calculation of average flow rate weighted relative to the past day flow rate. For example, a historical daily average flow rate and the prior day average flow rate can be weighted, e.g., 1:1, 2:1, 3:1, 4:1, 5:1, 6:1, 7:1, 3:2, 4:3, 5:2, 5:3, 6:5, 7:2, 7:3, 7:4, 7:5, and 7:6, can be used.

In some embodiments, an estimated number of days remaining until exhaustion of the ion exchange bed in an ion exchange column of a water treatment system is based on the current exchange daily average flow rate and the cumulative average flow rate of water through the ion exchange bed. The current exchange daily average flow rate may be calculated as the average flow rate of water per day through the ion exchange bed. In other cases, if an ion exchange bed was replaced or exchanged on a first day (day 1) and the flow rate of water through the ion exchange bed was 100 gallons, 110 gallons, and 105 gallons on days 1-3, respectively, the current exchange daily average flow rate as of day 3 would be (100+110+105)/3=105 gallons per day. The cumulative average flow rate may be calculated as the average flow rate of water per day through the ion exchange bed since the ion exchange column housing the ion exchange bed was installed or the system was initially put into operation. For example, if the ion exchange bed was in operation for 100 days and the total amount of water flowed through the ion exchange bed over those 100 days was 10,000 gallons, the cumulative average flow rate at the end of the 100 days would be 10,000/100=100 gallons/day. Alternatively, the cumulative average flow rate may be calculated as the average flow rate of water per day through the ion exchange bed for all available historical flow rates of water per day through the ion exchange bed or as the average flow rate of water per day through the ion exchange bed for only a set number of time periods between past instances of replacing or exchanging the ion exchange bed. Calculating the cumulative daily average flow rate may include calculating the average daily flow rate of water for a plurality of periods including a plurality of instances of replacing the ion exchange bed. Calculating the cumulative daily average flow rate of water may include calculating a prior period average daily flow rate of water through the water treatment system for a time period including a predetermined number of instances of replacing the ion exchange bed immediately preceding a receipt of indication of replacement of the ion exchange bed. The prior period average daily flow rate is the average daily flow rate of water through an ion exchange column between one or more instances of replacing the ion exchange media of the ion exchange column prior to the most recent replacement of the ion exchange media. Calculating the prior period average daily flow rate of water may include applying a greater weight to flow rates of water through the ion exchange bed closer in time to the current period than to flow rates of water through the water treatment system further in time from the current period. The prior period average daily flow rate may be utilized as the cumulative daily average flow rate in some embodiments disclosed herein.

The estimated number of days remaining to exhaustion of an ion exchange bed or ion exchange column may be based on a current tank capacity of the ion exchange bed, an average conductivity of the water for the current period since the ion exchange bed or column was previously exchanged or replaced, and the daily average flow rate of water through the ion exchange bed since the ion exchange bed or column was previously exchanged or replaced. Accordingly, determining the estimated number of days remaining to exhaustion of an ion exchange bed or ion exchange column may include measuring a conductivity of the water to be treated during a current period, determining a current average conductivity of water to be treated during the current period, and utilizing the current average conductivity of water to be treated in an equation for determining the estimated number of days remaining to exhaustion of an ion exchange bed or ion exchange column. The current average conductivity of water to be treated may be used as, for example, the Average Daily Conductivity in equation (5) above. Additionally or alternatively, determining the estimated number of days remaining to exhaustion of an ion exchange bed or ion exchange column may include performing a calculation as follows:

$$D_{remaining} = \left[ \frac{TC_{current}}{(\rho_{current} \times conversion\ factor) \times [(w_{cumulative} \times F_{cumulative}) + (w_{cuurrent} \times F_{current})]} \right],$$

where, $w_{cumulative}$ is the weighting factor applied on the cumulative daily average flow rate, $w_{current}$ is the weighting factor applied on the current average flow rate, $w_{cumulative} + w_{current} = 1$. $0.5 \leq w_{cumulative} \leq 0.9$, $0.1 < w_{current} < 0.5$, $F_{cumulative}$=cumulative daily average flow rate, $F_{current}$=current average f low rate, $D_{remaining}$=estimated number of days remaining to exhaustion, $TC_{current}$=current tank capacity, $P_{current}$=current daily average conductivity, When determining the estimated number of days remaining until exhaustion of the ion exchange bed a weighted daily average flow rate may be determined by applying a greater weighting to the cumulative daily average flow rate than a weighting applied to the current exchange daily average flow rate. The weighted daily average flow rate may be utilized in a calculation for determining the estimated number of days remaining until exhaustion of the ion exchange bed, for example, as the average flow utilized to calculate the 10 Day Average Flow Total in equation (5) above. Determining the weighted daily average flow rate may include, for example, performing a calculation as follows:

$$F_{weighted} = [(w_{cumulative}) \times (F_{cumulative})] + [(w_{current}) \times (F_{current})] \qquad (7)$$

wherein, $F_{weighted}$=weighted daily average flow rate, $F_{current}$=current exchange daily average flow rate, $F_{cumulative}$=cumulative daily average flow rate, $0.5 \leq w_{cumulative} \leq 0.9$, $0.1 < w_{current} < 0.5$, $w_{cumulative} + w_{current} = 1$.

In various embodiments, $0.2 < w_{current} < 0.4$ and/or $w_{current}$ is about 0.3. It has been empirically determined that a value of $w_{current}$ in equation (7) of about 0.3 provide good results when using the weighted average flow rate to determine a remaining useful lifetime or estimated time until exhaustion of an ion exchange media bed or ion exchange column in water treatment systems as disclosed herein.

The calculations referenced above may be performed locally at a water treatment system, for example, utilizing the controller 110 illustrated in FIG. 2A or 3, or utilizing the monitor/controller 455 illustrated in FIG. 5, or may be performed at the monitoring system or server 510 at a centralized monitoring location 500 located at a distance from the water treatment system or systems being monitored as illustrated in FIG. 6.

Based on the estimated number of days remaining until exhaustion of the ion exchange bed a request for replacement of the ion exchange bed may be generated. This request may be generated locally at a water treatment system, for example, utilizing the controller 110 illustrated in FIG. 2A or 3, or utilizing the monitor/controller 455 illustrated in FIG. 5, and may be transmitted to the monitoring system or server 510 at the centralized monitoring location 500. Alternatively, the request for replacement of the ion exchange bed may be generated by the monitoring system or server 510 at the centralized monitoring location 500 itself.

The service provider may schedule servicing of the ion exchange column(s) so that the ion exchange column(s) are serviced while still having a certain amount of treatment capacity, for example, 10% treatment capacity remaining (a remaining capacity alarm setpoint of 10%) to provide a safety margin to prevent the treated water from achieving an unacceptable quality. The service provider may also or alternatively schedule servicing of the ion exchange column(s) at a set period of time, for example, from five to ten days before the treatment capacity of the ion exchange column(s) is expected to become depleted. The service provider may set a fee for production of specified volume of treated water at the user's site based on the calculated frequency at which the ion exchange column(s) should be serviced.

The service provider may also or alternatively schedule service of the water treatment system based on alarms or out of control signals provided by the water treatment system. The alarms or out of control signals may be sent responsive to one or more monitored parameter exceeding a setpoint or being outside of an expected range (e.g., 5% or more above a five day average or a 10 day average) at a single point in time or for a period of time, for example, for five days or more. For example, for a service deionization system such as illustrated in FIG. 5, worker probe S2 may provide an indication that the conductivity of water exiting the ion exchange column 440 is increasing to a level indicative of imminent depletion of the ion exchange bed in the ion exchange column 440. The service provider may receive a notification of the indication from worker probe S2 via, for example, the monitor/controller 455 and may schedule service of the ion exchange column 440. Based on the conductivity readings from the worker probe S2 and the measured flow rate through the system, the service provider may calculate a remaining treatment capacity of the ion exchange bed in the ion exchange column 445 and adjust a schedule for servicing the ion exchange column 445 accordingly. In some embodiments, the ion exchange column 440 should be serviced within about two days from the indication provided from the sensor S1. Additionally, if the polisher probe S3 provides an indication that the conductivity of the water exiting the ion exchange column 445 is approaching or exceeding an unacceptable level, if the leak sensor 460 provides an indication of a water leak, or if a pressure sensor or sensors (e.g., one or more of sensors 205, 210, or 215 of FIG. 3) provides an indication of an unacceptable or unacceptably trending pressure across one or more components of the treatment system, the service provider may schedule a service call to service one or more of the components of the water treatment system.

The service provider may also or alternatively schedule service based on one or more signals indicative of a potential system problem from one of the ancillary systems 150A, 150B, 150C illustrated in FIG. 2B, for example, failure of a pump, unexpectedly high power draw from one of the ancillary systems, unacceptable pressure drop across one of the ancillary systems, etc. Any alerts, alarms, or out of control signals provided to the service provider may also or alternatively be provided to a user of the treated water produced by the water treatment system, an operator of the water treatment system or a component thereof, or an owner of the system or component thereof if the owner is not the service provider.

In some embodiments, the central server 510 located at the centralized monitoring location 500 may determine when and which components of water treatment systems at various user or customer sites 505A, 505B, 505C should be serviced. The central server located at the centralized monitoring location 500 may communicate a service schedule to one or more service provider locations 515A, 515B. The central server 510 located at the centralized monitoring location 500 may send service requests or schedules to one or one or more service provider locations 515A, 515B that optimize factors such as travel time between the service provider locations 515A, 515B and sites at which equipment may be in need of service. For example, the central server may send a service schedule to a service provider location that is closer to a site having equipment that should be serviced than another service provider location. The central server may adjust the service schedule so that one or more components of a water treatment system at one of user or customer sites 505A, 505B, 505C is serviced earlier or later than optimal based on the remaining treatment capacity of the one or more components if doing so would provide for multiple components to be serviced in a single service trip and thus cause an overall reduction in costs by reducing a number of individual service trips that are taken by the service provider. For example, if service is scheduled to replace an ion exchange column (or columns) at a first site, and a second site close to the first site has one or more ion exchange columns that have a remaining capacity of less than about 10% more than their remaining capacity alarm setpoint and/or a Projected Days Left of a week or less, replacement of the ion exchange column(s) at the second site may be scheduled to be performed during a same service trip to replace the ion exchange column(s) at the first site.

Costs associated with regenerating ion exchange columns may also be factored into decisions on when to replace ion exchange columns approaching exhaustion at different sites. With some ion exchange columns if the resin in the ion exchange column still has remaining treatment capacity, the resin bed may be first completely exhausted prior to being regenerated. To exhaust the resin bed, additional chemicals may be passed through the resin bed. More chemicals may be required to exhaust and then regenerate an ion exchange column with 20% remaining capacity than a similar ion exchange column with 10% remaining capacity. The chemicals used to exhaust a resin bed in an ion exchange column have an associated cost. Accordingly, if, in the example above, costs (e.g., fuel costs and worker time) associated with travel to the second site in addition to costs associated with the chemicals used for regenerating the ion exchange columns at the second site earlier than necessary exceed costs (e.g., fuel, labor, etc.) that might be associated with replacing the ion exchange columns at the second site in a different service trip than the service trip for replacing the ion exchange column(s) at the first site, different service trips for the two different sites may be scheduled instead of just one.

In some embodiments, for example, a first water treatment system may be located at a first site and a second water treatment system may be located at a second site at a distance from the first site. A method of servicing the water treatment systems at the first and second sites may include determining whether to replace the ion exchange bed of the water treatment system at the first site and a second ion exchange bed of at the water treatment system at the second site in a same service trip. Determining whether to replace both the ion exchange bed of the first water treatment system at the first site and the second ion exchange bed of the second water treatment system at the second site in the same service trip may include weighing a cost associated with regenerating the ion exchange bed from the first site and the ion exchange bed from the second site against a cost associated with different service trips to the first and the second sites. Further, the first water treatment system may be located at a first site in a network of a plurality of different sites each including at least one water treatment system having an ion exchange bed, and the method of servicing the water treatment systems may further include determining a subset of ion exchange beds of the plurality of sites to be replaced in a same service trip.

Components of a water treatment system which may be serviced by a service provider are not limited to ion exchange columns and the water quality parameter or parameters used to determine when to service the components water treatment systems are not limited to conductivity or ionic concentration and flow rate. In other embodiments, a water treatment system may include a turbidity sensor upstream of one or more water treatment devices. The one or more water treatment devices may have a limited capacity for removing turbidity from water undergoing treatment in the one or more water treatment devices. The one or more water treatment devices may include, for example, a filter (e.g., a sand filter or other form of solids-liquid separation filter) that has a limited capacity for removal of solids from water before becoming clogged or otherwise rendered ineffective for further treatment of turbidity. The flow rate of water through the one or more water treatment devices and the turbidity of the water to be treated may be monitored to determine an expected service lifetime of the one or more water treatment devices. Service of the one or more water treatment devices may then be scheduled to be performed prior to the end of the service lifetime of the one or more water treatment devices.

In another example, the one or more water treatment devices may include a pressure-driven separation device, for example, a nanofiltration device or a reverse osmosis device and the parameters used to determine when the one or more water treatment devices should be serviced include pH and/or temperature measured by one or more pH or temperature sensors upstream, downstream, or within the one or more water treatment devices.

Aspects and embodiments disclosed herein also include methods of retrofitting an existing wastewater treatment system to perform methods as disclosed herein. Retrofitting an existing wastewater treatment system may include programming a controller, local and/or remote, of the wastewater treatment system to perform an embodiment of the AI algorithm disclosed herein. Alternatively, a service provider may provide a customer with a non-transitory computer readable medium including instructions which when executed on a controller, local and/or remote, of the wastewater treatment system to cause the wastewater treatment system to perform embodiments of the AI algorithm disclosed herein. A service provider may provide instructions, written, verbal, or in electronic form to a customer explaining how to operate the AI algorithm and how to interpret and react to its outputs.

Example 1: Mixed Bed Tanks—Suggestion to Reduce Site Visits

A customer site has performed three DI tank exchanges in the previous year.
The tank configuration is:
  Size 1.2 cubic feet
  1 mixed bed worker tank and 1 mixed bed polisher tank (2 tanks total)
  Average feed water conductivity: 394 micro-siemens ($\mu$S/cm$^2$)
  Each exchange was performed adequately and occurred approximate between 700 and 1000 gallons of water treated.
  Total gallons consumed: Approximately 2553
The cost of the three exchanges totaled approximately $1000.
The capacity for the mixed bed DI resin is 7600 grains/ft$^3$.
  24.4 is the conversion factor from micro-siemens to grains/gallon
  e.g. ($\mu$S/cm2)/(grains/gallon)

Theoretical Maximum of 2553 gallons would require_ X__tanks

If the site stays with 1.2 ft³ tanks: 2553/{[24.4×(1.2×7600)]/394}=4.5 (round down to four worker tanks because the system utilizes 1 polisher tank)

If the site switches to using to 3.6 ft³ tanks: 2553/{[24.4×(3.6×7600)]/394}=1.5 (Round up to two tanks—one polisher tank and one worker tank)

Savings: From $1000 for three trips to one trip @ $333→Savings of ~$666.

Thus, it is possible to achieve substantial savings by reducing the number of customer site visits/year. This also provides a greater level of reliability to the customer since with service deionization, which is a batch process, there will be a much longer time between each service deionization cylinder change out. Also, there are fewer quality alarms which should mean that the water quality is superior.

Example 2: Service Order Reduction

After implementation of a Tank Exchange Prediction Model as disclosed herein positive trends have been identified in site efficiencies related to Service Orders (SVO) created per site and the amount of resin being consumed per exchange while maintaining the desired level of quantity and quality of water delivered to the customer.

Service Order Analysis—a metric as to site efficiency is SVO count/site.

Pre-Model Implementation—From fiscal year (FY) 1 to FY 2, IoT Device (site or functional location) Count increased by 21.6% and SVO Count increased by 73.0%. The SVO Count/Device increased by 42.3% and $158 per site was spent on Labor Costs (total $245 k) as compared from the previous fiscal year.

Post-Model Implementation—From FY 2 to FY 3, IoT Device Count increased by 19.3% and SVO Count increased by 28.7%. The SVO Count/Device only increased by 7.8% and $132 less was spent per site on Labor Costs (total savings $243 k) as compared from FY 1 to FY 2.

Most of this savings occurred during the last five months of the fiscal year when the model was in place.

Note savings was recognized even with an increased average labor rate from FY 2 to FY 3.

Data regarding the number of active devices, quality alarms, SVO Count and labor costs for fiscal years 1-3 are indicated in the Tables of FIGS. 7 and 8, respectively.

The data if FIG. 7 shows that while the yearly increase in device counts remained about the same (~20%), the rate of increase in the number of SVOs to service those site increased at a much slower rate. The "Linear Ratio" column shows that the SVO Count/site should have been about 3.8 in FY3, but because of the improvements in efficiencies related to this program, the SVO Count/site was only 3.5.

The data in FIGS. 7 and 8 also shows that from FY1 to FY2, IoT Device Count increased by 21.6% and SVO Count increased by 73.0%. The SVO Count/Device increased by 42.3% and labor costs were $158 more per site (total $245 k) in FY2 as compared to FY1. From FY2 to FY3, IoT Device Count increased by 19.3% and SVO Count increased by 28.7%. The SVO Count/Device only increased by 7.8% and labor costs were $132 less per site (total savings $243 k) in FY3 as compared to FY2.

Resin Consumption—Sites are most efficient when exchanges occur at 0% remaining capacity and a valid worker quality alarm is active.

The Tank Exchange Prediction Model was implemented in May of FY 3.

Pre-Model Implementation—From FY 1 to FY 2—The average remaining capacity at time of exchange for the fiscal year was 29%.

Post Model Implementation—From FY 2 to FY 3—The average remaining capacity at time of exchange for FY 3 was 25% which accounts for a 5% improvement in resin use year over year. When considering only those months in which the machine learning model was in place from May to September, the average remaining capacity at time of exchange dropped to 22% which is a 7% improvement from FY 2.

It is an effective 24% increase in the amount of resin used since the model implementation ((29%-22%)/29%)=24.1%

Post Model Data—Start of FY 3—The first month of the fiscal year saw a continued reduction in average remaining capacity at time of exchange to 18% continuing the trend of getting the average remaining capacity closer to 0%.

Figure 9:
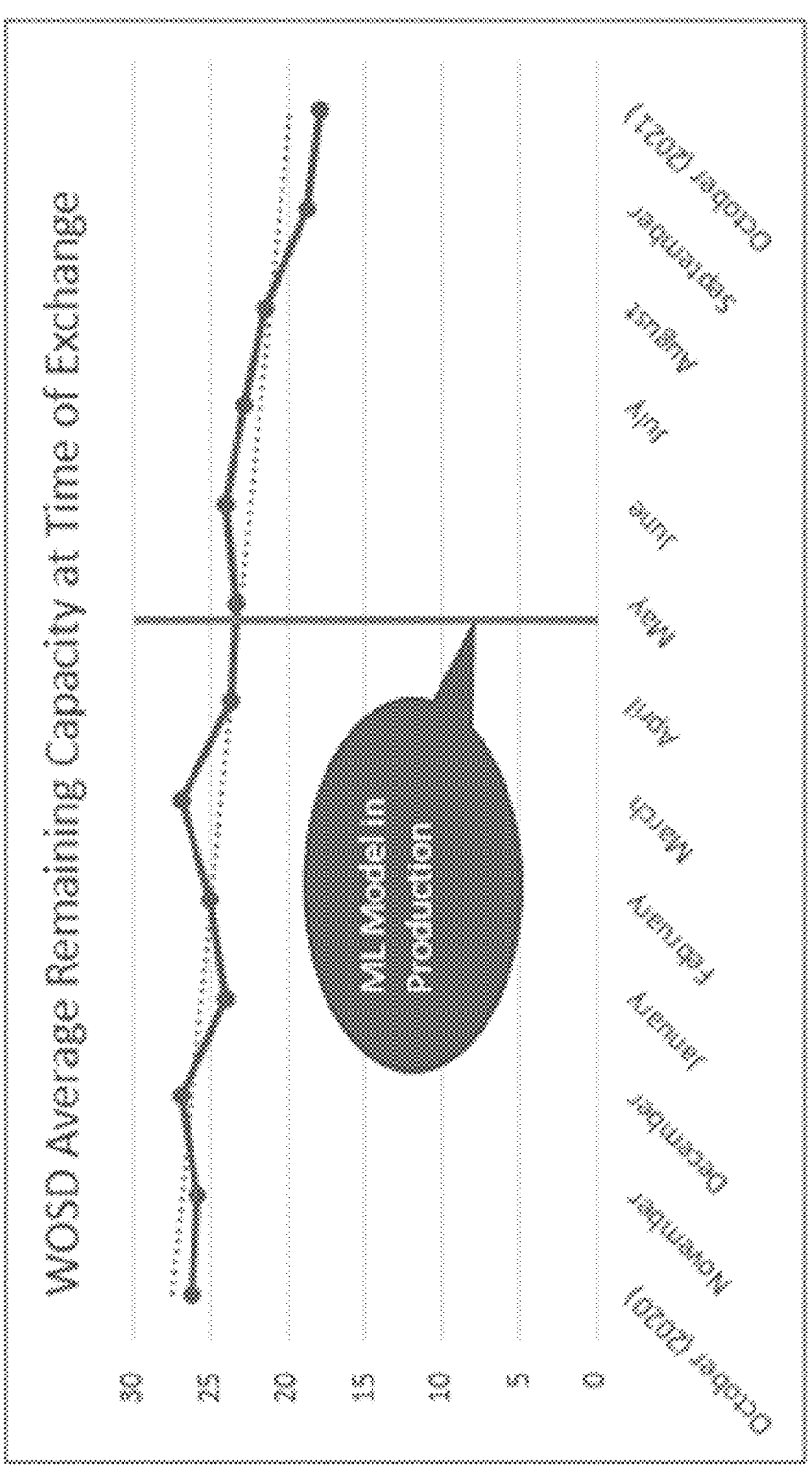
FIG. 9 is a chart illustrating a reduction in remaining ion exchange capacity at time of ion exchange media bed replacement achieved by implementation of an artificial intelligence algorithm as disclosed herein.

A chart of remaining capacity at time of exchange per month from October FY 2 to October FY 3 is illustrated in FIG. 9.

Example 3: Avoiding Service Orders for False Alarms

Figure 10:
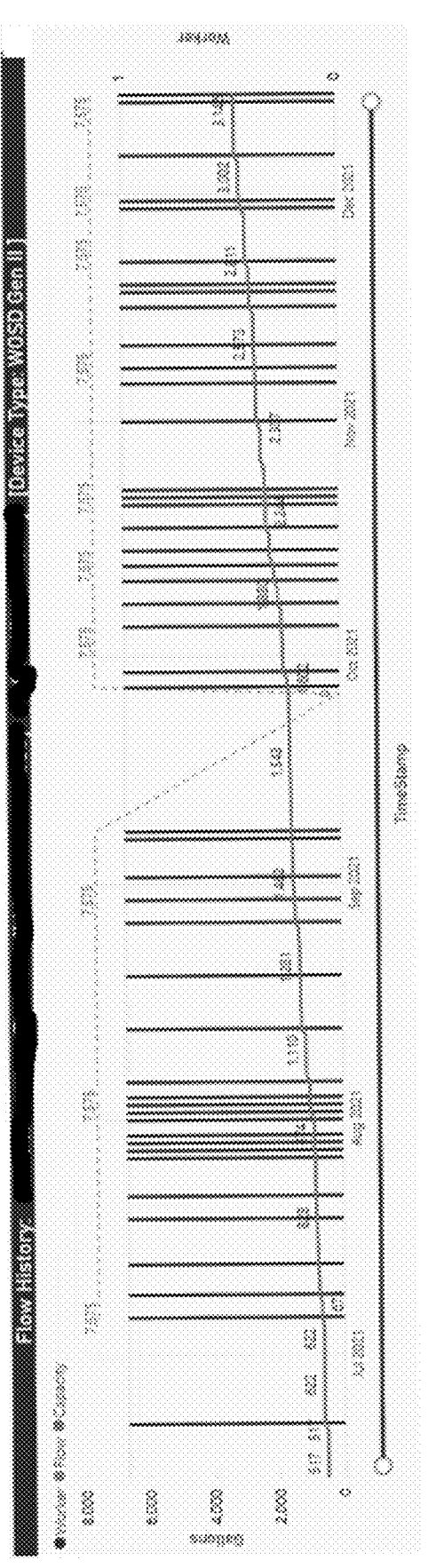
FIG. 10 is a chart illustrating a pattern of false water quality alarms in an embodiment of a water treatment system.

At one customer site several worker tank alarms have been triggered since the most recent tank exchange in February 2021. Under prior manual alarm triage review, it was very plausible that at any point in time when a worker alarm was present, a tank exchange service order could have occurred. With the AI Algorithm in control, it considers not only the Worker Quality alarm but also the fact that the site still has expected capacity (Remaining Capacity>30%) and recent usage and recommends a user to MONITOR the site. As of December 2021 the site is still producing in spec water and is exhausting as much of the tank as is practical. A visual representation of the cumulative flow through the DI system and the incidences of false worker alarms is shown in FIG. 10, wherein the vertical lines represent instances of false worker tank alarms.

Example 4: Delay of Creation of Service Order to Confirm it is Warranted

A site that is set up optimally and has a stable set of configuration variables of conductivity and flow patterns exhibits a normal progression of recommendations from No Action, to Monitor, to Create SVO.

Figures 11, 12:
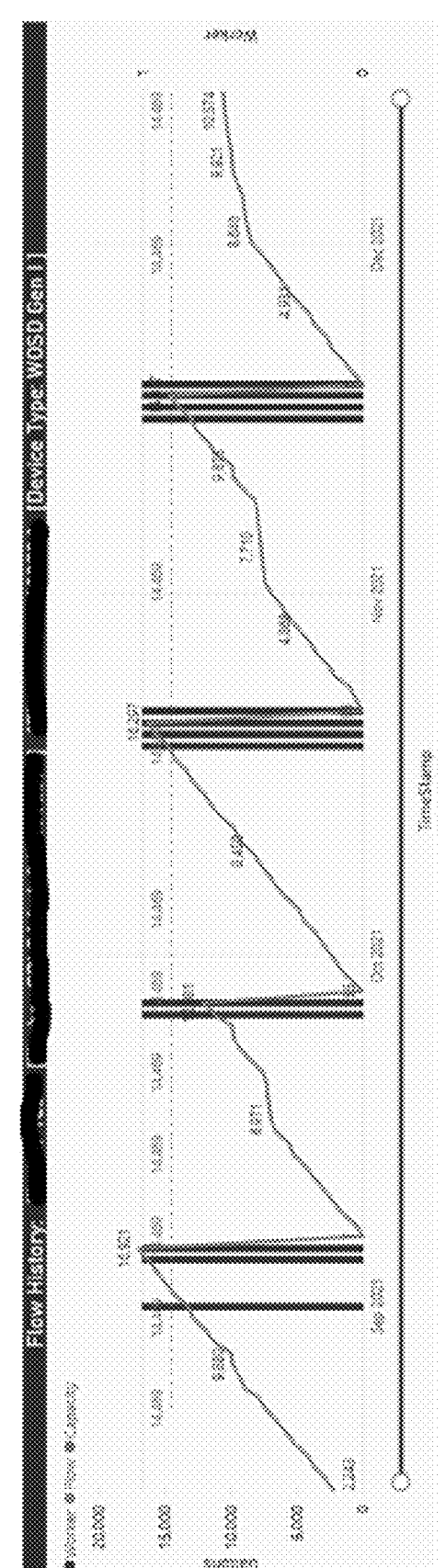
FIG. 11 is a chart indicating remaining ion exchange capacity at time of ion exchange media bed replacement achieved by implementation of an artificial intelligence algorithm as disclosed herein.
FIG. 12 is a chart illustrating a pattern of false water quality alarms and cumulative water treatment volume in an embodiment of a water treatment system.

A table showing resin consumption and gallons between tank exchanges is for this site is shown in FIG. 11. A chart showing cumulative water treated between exchanges and incidents of worker tank alarms is shown in FIG. 12.

The 10/21/21 exchange for which the recommendation by the AI Algorithm went from No Action to Create SVO is correctly calculated as the exchange occurred while still providing in spec water.

The 12/15/21 exchange is an example of the AI Algorithm recommending waiting a day to perform the exchange even though the worker tank quality alarm was present on 12/14. The algorithm appropriately recommended to Monitor on 12/14 because not all available sensor data met the standard of Create SVO. The extra day allowed for 3% more resin to be consumed when additional sensor data was examined.

Three of the last four exchanges occurred between 23 and 26 days and utilized most of the resin. The exchange that occurred after only 20 days was identified correctly as the cycle has a higher daily consumption rate than normal and thus the resin was exhausted quicker.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of treating water in a water treatment system, the method comprising:

introducing water to be treated into an ion exchange bed of the water treatment system to produce treated water;

receiving an output water quality indication from a controller associated with the ion exchange bed;

determining, by an algorithm, responsive to the output water quality indication, whether to replace the ion exchange bed based on a remaining capacity of the ion exchange bed, current operational parameters of the water treatment system, and historical data regarding operation of the water treatment system; and responsive to the output water quality indication, providing, by the algorithm, a recommendation to a service provider of the water treatment system that there is one of no action required, that the ion exchange bed should be monitored, or that a service order for replacement of the ion exchange bed should be generated, and an indication of a confidence level of the provided recommendation.

2. The method of claim 1, further comprising replacing the ion exchange bed responsive to the algorithm indicating that the replacement of the ion exchange bed is warranted.

3. The method of claim 1, wherein the algorithm determines the confidence level based on the historical data regarding one of instances of the replacement of the ion exchange bed or instances of replacement of an ion exchange bed of another water treatment system, ion exchange bed alarm status, and the remaining capacity of the ion exchange bed.

4. The method of claim 1, wherein responsive to providing the recommendation that the ion exchange bed should be monitored the algorithm performs additional monitoring of one or more of a status of the output water quality indication, a flow rate of the water through the ion exchange bed, a quality measure of the water, and the remaining capacity of the ion exchange bed.

5. The method of claim 4, wherein the algorithm modifies the recommendation that the ion exchange bed should be monitored to one of a recommendation that the ion exchange bed should be replaced or a recommendation that no action is required responsive to analysis of data gathered during the additional monitoring.

6. The method of claim 5, wherein the additional monitoring includes receiving the data regarding the one or more of the status of the output water quality indication, the flow rate of the water through the ion exchange bed, or the quality measure of the water multiple times per day.

7. The method of claim 1, wherein the current operational parameters of the water treatment system include flow rate and conductivity of the treated water.

8. The method of claim 7, wherein the current operational parameters of the water treatment system further include environmental conditions at the water treatment system.

9. The method of claim 7, wherein the current operational parameters of the water treatment system further include time of year.

10. The method of claim 1, wherein the historical data regarding the operation of the water treatment system includes environmental conditions at the water treatment system between previous occurrences of the replacement of the ion exchange bed.

11. The method of claim 1, wherein the historical data regarding the operation of the water treatment system includes times of year of previous occurrences of the replacement of the ion exchange bed.

* * * * *